US009066469B2

United States Patent
Kimura et al.

(10) Patent No.: US 9,066,469 B2
(45) Date of Patent: Jun. 30, 2015

(54) RIDING LAWN MOWER

(71) Applicant: HONDA MOTOR CO., LTD., Tokyo (JP)

(72) Inventors: Tomokazu Kimura, Wako (JP); Toshiro Uchida, Wako (JP); Kohei Akazawa, Wako (JP); Takahiro Yamamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 14/023,589

(22) Filed: Sep. 11, 2013

(65) Prior Publication Data

US 2014/0075901 A1 Mar. 20, 2014

(30) Foreign Application Priority Data

Sep. 20, 2012 (JP) ................................. 2012-206844

(51) Int. Cl.
| | | |
|---|---|---|
| A01D 43/00 | (2006.01) | |
| A01D 43/063 | (2006.01) | |
| A01D 34/64 | (2006.01) | |
| A01D 34/00 | (2006.01) | |
| A01D 42/00 | (2006.01) | |

(52) U.S. Cl.
CPC .............. *A01D 43/063* (2013.01); *A01D 34/64* (2013.01); *A01D 34/005* (2013.01); *A01D 42/005* (2013.01)

(58) Field of Classification Search
CPC ... A01D 42/005; A01D 34/005; A01D 34/63; A01D 34/64; A01D 34/71; A01D 34/828; A01D 34/824; A01D 43/077; A01D 43/063; A01D 2101/00
USPC ............ 56/202, 255, 295, 320.1–320.3, 17.4, 56/17.5, 6, 1

See application file for complete search history.

(56) References Cited

U.S. PATENT DOCUMENTS

| | | | | |
|---|---|---|---|---|
| 6,694,716 B1 * | 2/2004 | Osborne | .......................... | 56/202 |
| 6,862,875 B2 * | 3/2005 | Iida et al. | ..................... | 56/320.2 |

(Continued)

FOREIGN PATENT DOCUMENTS

| | | |
|---|---|---|
| JP | 63-63306 A | 3/1988 |
| JP | 2000-050716 A | 2/2000 |

(Continued)

OTHER PUBLICATIONS

EESR dated Jan. 17, 2014, issued in corresponding European Application No. 13184331.0.

*Primary Examiner* — Robert Pezzuto
(74) *Attorney, Agent, or Firm* — Westerman, Hattori, Daniels & Adrian, LLP

(57) ABSTRACT

A riding lawn mower includes: a delivery passage for delivering cut grass from a housing to a receptacle; and a shutter mechanism provided on a lower portion of the delivery passage for switching the mower between a bagging mode in which cut grass is delivered from the housing to the receptacle and a mulching mode in which cut grass is discharged downward of the housing. The shutter mechanism includes a horizontal pivot shaft disposed on the lower portion of the delivery passage, and a shutter plate pivotable about the pivot shaft between a fully closed position where the shutter plate closes the delivery passage to place the mower in the mulching mode and a fully opened position where the shutter plate is laid down toward a discharge side of the delivery passage to place the mower in the bagging mode.

11 Claims, 17 Drawing Sheets

(56) References Cited

U.S. PATENT DOCUMENTS

| | | |
|---|---|---|
| 6,874,309 B1 * | 4/2005 | Bellis, Jr. .................... 56/320.2 |
| 6,910,324 B2 * | 6/2005 | Kakuk ........................... 56/255 |
| 8,065,866 B2 * | 11/2011 | Tamas et al. ................... 56/202 |
| 2002/0083694 A1 | 7/2002 | Nagai et al. |
| 2010/0043379 A1 | 2/2010 | Imanishi et al. |

FOREIGN PATENT DOCUMENTS

| | | |
|---|---|---|
| JP | 3418136 B2 | 6/2003 |
| WO | 2009/086581 A1 | 7/2009 |

* cited by examiner

RIDING LAWN MOWER

FIELD OF THE INVENTION

The present invention relates to an improvement of riding lawn mowers which include a shutter mechanism for switching between a bagging mode and a mulching mode.

BACKGROUND OF THE INVENTION

Among the conventionally-known riding lawn mowers is the so-called rotary lawn mower which cuts grass by rotating a cutting blade, accommodated in a downwardly-opening housing, along the surface of grass. Examples of such a rotary lawn mower include a type for use in a mulching mode and a type for use in a bagging mode. The lawn mower for use in the bagging mode collects grass cut by the cutting blade (i.e., cut grass or grass clippings) in a grass clippings receptacle, while the lawn mower for use in the mulching mode chops the grass clippings into finer pieces within the housing and discharges the thus-chopped glass clippings downward of the housing.

However, it is often inconvenient to use such two types of lawn mowers depending on intended purposes. So, recent years have seen development of a technique for allowing a single riding lawn mower to be used in both of the bagging and mulching modes. More specifically, such a riding lawn mower operable in both of the bagging and mulching modes is manually switchable between the bagging mode in which a shutter plate is placed in a fully opened position to allow grass clippings to be collected in the grass clippings receptacle and the mulching mode in which the shutter plate is placed in a fully closed position to allow glass clippings to be discharged downward of the housing.

A similar technique to the aforementioned is known from Japanese Patent Application Laid-Open Publication No. SHO-63-063306 (hereinafter referred to as "Patent Literature 1"), Japanese Patent Application Laid-open Publication No. 2000-050716 (hereinafter referred to as "Patent Literature 2") and Japanese Patent No. 3418136. More specifically, from Patent Literatures 1 to 3, a riding lawn mower is known, in which a path for delivering grass clippings from the housing to the grass clippings receptacle is controlled via a shutter mechanism so as to discharge the grass clippings onto the ground surface.

The riding lawn mower known from Patent Literatures 1 to 3 includes the shutter mechanism provided on a grass clippings delivery passage over which grass cut by the cutting blade (i.e., grass clippings) is delivered from the housing to the grass clippings receptacle. The shutter mechanism includes a horizontal pivot shaft (hinge shaft) disposed on a lower portion of the grass clippings delivery passage, and the shutter plate pivotable about the pivot shaft for opening and closing the grass clippings delivery passage. More specifically, the shutter plate is pivotable between a fully closed position where it closes the grass clippings delivery passage and a fully opened position where it is laid down toward an entrance of the grass clippings delivery passage for opening the grass clippings delivery passage. Namely, the shutter mechanism employed in the riding lawn mower disclosed in Patent Literatures 1 to 3 is of a rear hinge type where the pivot point of the shutter plate is located at a rear portion of the shutter plate. In the so-called rear-hinge-type shutter mechanism, the shutter plate in the fully opened position is laid down in a direction opposite from a direction where grass clippings and delivering air flow from the housing to the grass clippings receptacle.

The delivering air for delivering grass clippings from the housing to the grass clippings receptacle flows along the grass clippings delivery passage. Such grass clippings delivering air differs in velocity or force (i.e., kinetic energy of the delivering air) between when the lawn mower is in the middle of a grass cutting operation and when the lawn mower is starting or stopping the grass cutting operation. More specifically, the force of the grass clippings delivering air when the lawn mower is starting or stopping the grass cutting operation is smaller than that when the lawn mower is in the middle of the grass cutting operation. When the force of the grass clippings delivering air is small, the grass clippings would fall onto the bottom surface of the grass clippings delivery passage halfway through the delivery. Particularly, a lot of heavy grass clippings (e.g., grass clippings containing much moisture content) would accumulate on the bottom surface of the grass clippings delivery passage. Generally, the shutter mechanism has a stepped section on or near the hinge section, and grass clippings would easily accumulate on the stepped section.

In the rear-hinge-type shutter mechanism, dispensing with the stepped section is one conceivable approach to avoid the aforementioned problem. Such an approach, however, is not advisable in that not only the shutter mechanism would become complicated in construction but also there would arise a need to greatly change the shape of the grass clippings delivery passage. Generally, because grass clippings delivering air of a relatively great pressure is generated when the operation of the lawn mower has been started again, it has been conventional to use such grass clippings delivering air of a relatively great pressure to blow away, to some extent, the grass clippings accumulated on the bottom surface of the grass clippings delivery passage.

However, in the rear-hinge-type shutter mechanism, the grass clippings delivering air flowing along the delivery passage would decrease in force at and around the hinge section. Thus, grass clippings falling on the bottom surface of the delivery passage would still accumulate on the stepped section formed on the hinge section. Besides, it is difficult for the grass clippings delivering air to reach a neighborhood behind the hinge section. Substances deposited on the neighborhood behind the hinge section may often remain deposited because the blowing-away force of the grass clippings delivering air applied to that neighborhood is weak. Besides, it is preferable to minimize the frequency of maintenance/inspection and cleaning operations to be performed on the shutter mechanism.

SUMMARY OF THE INVENTION

In view of the foregoing prior art problems, it is an object of the present invention to provide an improved technique which can minimize jamming of grass clippings in the shutter mechanism and thereby minimize the frequency of maintenance/inspection and cleaning operations to be performed on the shutter mechanism.

In order to accomplish the above-mentioned object, the present invention provides an improved riding lawn mower, which comprises: a housing opening downward and having a cutting blade accommodated therein; a cut grass receptacle disposed rearward of the housing; a cut grass (grass clippings) delivery passage for delivering grass, cut by the cutting blade, from the housing to the cut grass receptacle; and a shutter mechanism provided on a lower portion of the cut grass delivery passage for switching the lawn mower between a bagging mode in which grass cut by the cutting blade is delivered from the housing to the cut grass receptacle and a mulching mode in which grass cut by the cutting blade is discharged downward of the housing, the shutter mechanism including a horizontal pivot shaft disposed on the lower portion of the cut grass delivery passage, and a shutter plate pivotable about the pivot shaft between a fully closed position where the shutter plate closes the cut grass delivery passage in order to execute the mulching mode and a fully opened position where the shutter plate is laid down toward a discharge side of the cut grass delivery passage in order to execute the bagging mode.

According to the present invention, the shutter mechanism for switching the lawn mower between the bagging mode and the mulching mode includes the horizontal pivot shaft (or hinge shaft) disposed on the lower portion of the cut grass delivery passage, and the shutter plate pivotable about the pivot shaft for opening or closing the cut grass delivery passage. More specifically, the shutter plate is pivotable about the pivot shaft between the fully closed position where the shutter plate closes the cut grass delivery passage to execute the mulching mode and the fully opened position where the shutter plate is laid down toward the discharge side of the cut grass delivery passage to execute the bagging mode. The shutter mechanism employed in the present invention is of a so-called front hinge type where the pivot point of the shutter plate is disposed on a front portion of the shutter plate. Thus, in the fully opened position, the shutter plate is laid down in a direction along which cut grass delivering air and cut grass (grass clippings) flow from the housing to the cut grass delivery passage.

Because the shutter mechanism is of such a front hinge type, a hinge section and other component parts around the hinge section are located near an entrance of the cut grass delivery passage. Because the entrance of the cut grass delivery passage is connected to the housing, the cut grass delivering air has a relatively great force in the neighborhood of the entrance, so that grass clippings are less likely to fall on and around the hinge section. Further, even in case grass clippings have fallen and accumulated on and around the hinge section, they can be easily blown away by the cur grass delivering air. Thus, it is possible to effectively prevent unwanted jamming of grass clippings in the shutter mechanism, particularly in the hinge section, as a result of which the present invention can minimize the frequency of maintenance/inspection and cleaning operations to be performed on the shutter mechanism.

Preferably, the riding lawn mower of the present invention further comprises an operation section operable to switch the shutter plate between the fully closed position and the fully opened position, and the operation section is disposed away from the shutter mechanism. The shutter mechanism is constructed as a single unit integrally including: a base mounted on a lower portion of the cut grass delivery passage; the pivot shaft and the shutter plate assembled to the base; and an operating force transmission section for transmitting opening/closing operation force, given via the operation section, to the shutter plate. Because the shutter mechanism is a unitized mechanism (i.e., constructed as a single unit), it can be detachably attached together as the unit to the cut grass delivery passage. Thus, at the time of maintenance/inspection or cleaning operations, the shutter mechanism can be easily and simply detached and attached from and to the cut grass delivery passage. As a result, the maintenance/inspection and cleaning operations can be performed with ease on the shutter mechanism and the interior of the cut grass delivery passage.

Further, preferably, the pivot shaft and the shutter plate are disposed with a space from the bottom surface of the cut grass delivery passage. As the cutting blade stops rotating, the cut grass delivering air stops being generated, and thus, grass clippings would fall and accumulate on the bottom surface of the cut grass delivery passage and on and around the hinge section. However, by the provision of the above-mentioned space in the present invention, grass clippings are less likely to accumulate on the pivot shaft and the shutter plate and jam in the shutter mechanism.

Preferably, the riding lawn mower of the present invention further comprises a scroll guide provided in an entrance of the cut grass delivery passage for directing the cut grass and cut grass delivering air to the cut grass delivery passage while swirling the cut grass and the cut grass delivering air within the housing, and the scroll guide has, at the rear end thereof, a downwardly-recessed stepped section for accommodating therein the pivot shaft of the shutter mechanism. Thus, when the shutter plate is in the fully opened position where it is laid down toward the discharge side (output side) of the grass clippings delivery passage, the hinge section does not project into the grass clippings delivery passage. Namely, the shutter mechanism has no stepped section in and around the hinge section. Thus, even when grass cuttings have fallen on the bottom surface of the cut grass delivery passage, they do not accumulate on the bottom surface because they can be easily blown away by the cut grass delivering air. Thus, it is possible to effectively prevent jamming of grass clippings in the hinge section, as a result of which the present invention can even further minimize the frequency of maintenance/inspection and cleaning operations. Besides, because the shutter mechanism has no stepped section in and around the hinge section, any particular construction is not required to eliminate a stepped section from the hinge section.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

In the following description, the terms "front", "rear", "left", "right", "upward", "downward" etc. are used to refer to directions as viewed from a human operator of a riding lawn mower of the present invention.

Figure 1:
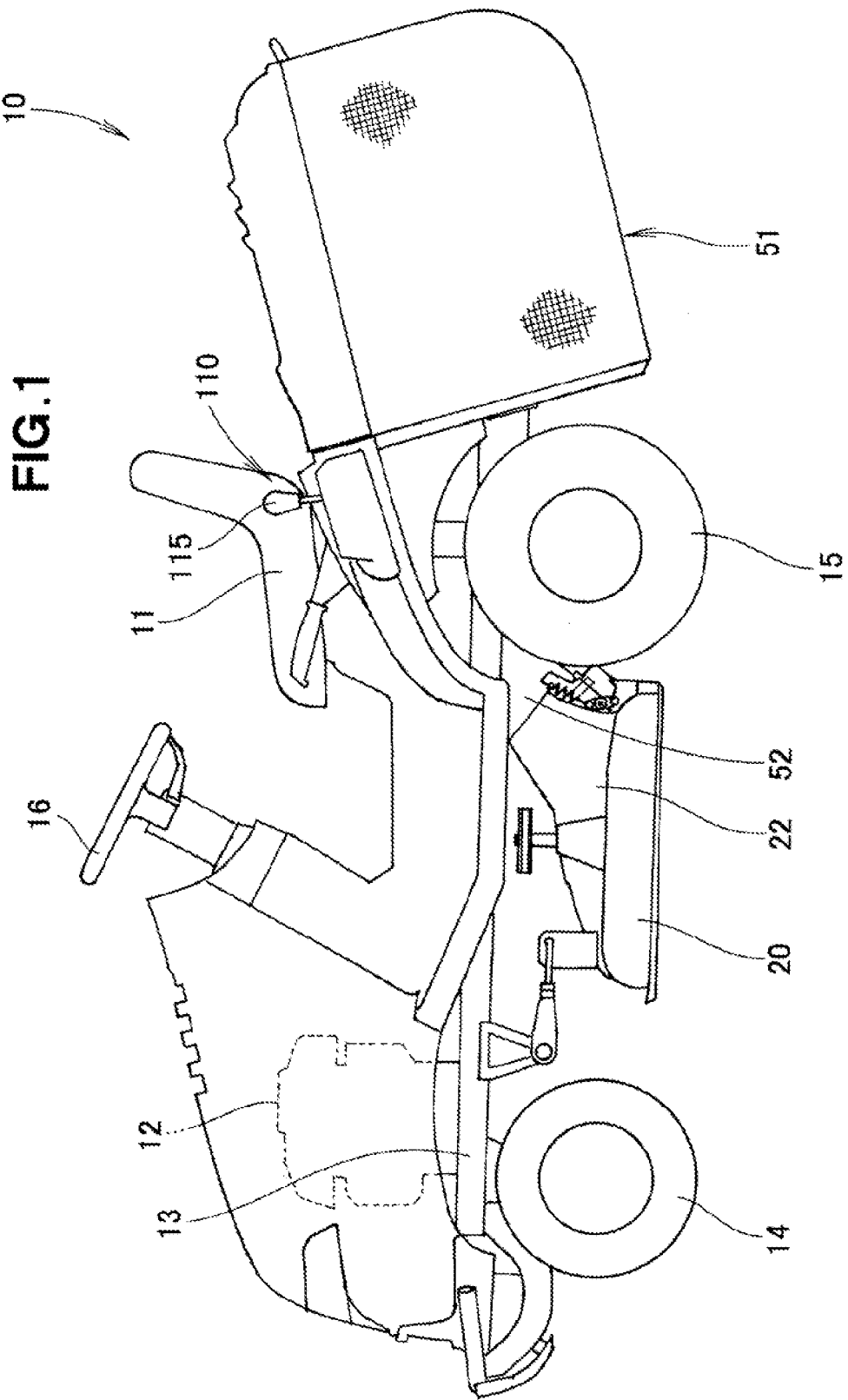
FIG. 1 is a left side view of an embodiment of a lawn mower of the present invention.
Figure 2:
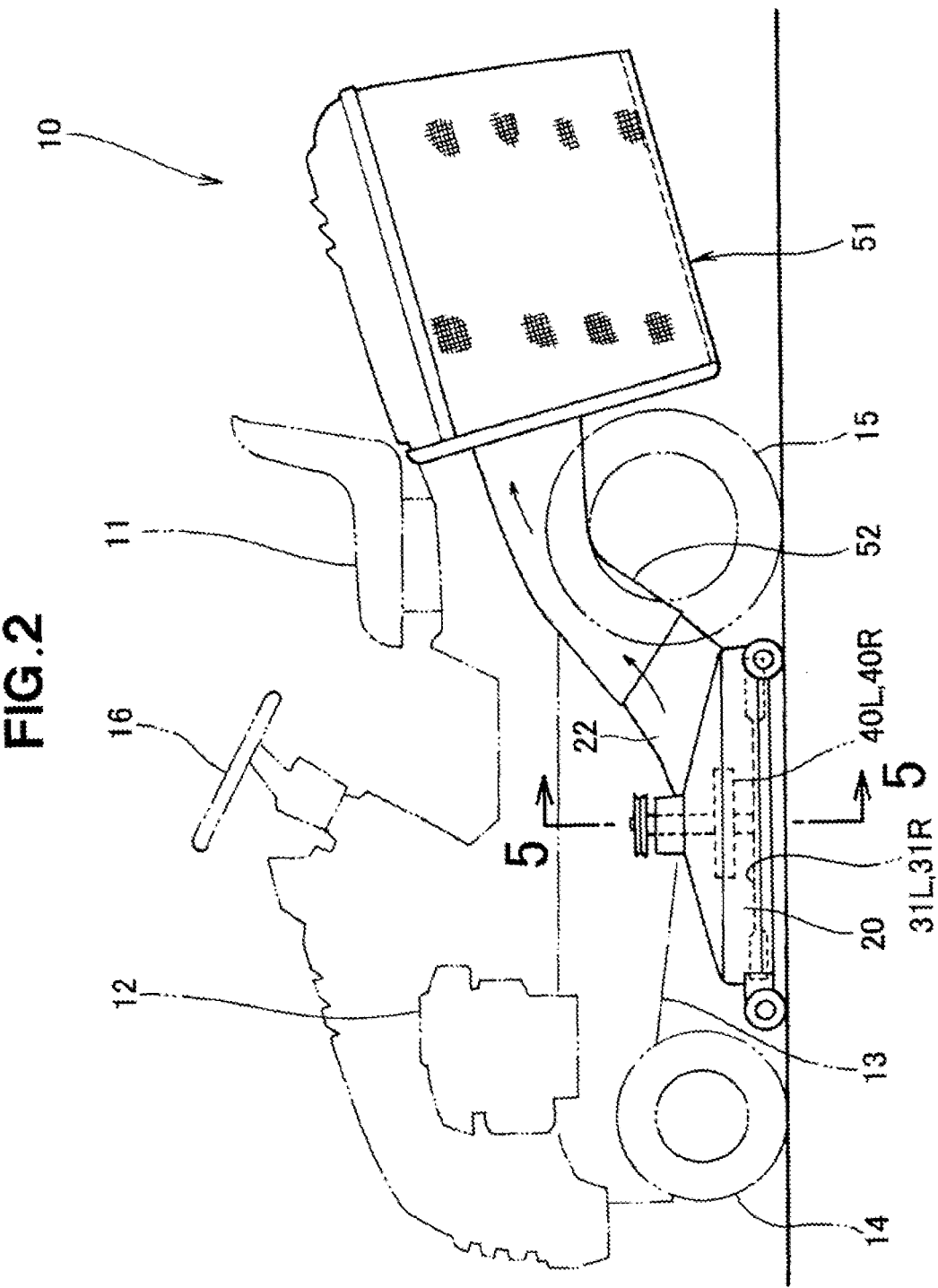
FIG. 2 is a left side view of a housing, grass clippings delivery passage, chute and grass clippings receptacle shown in FIG. 1.

Now, a description will be given about an embodiment of the riding lawn mower 10 of the present invention. As shown in FIGS. 1 and 2, the riding lawn mower 10 is a working machine of a type in which the human operator rides on a seat 11 and drives a grass cutting system while running the lawn mower 10 by means of a single power source 12.

The power source 12 is, for example, in the form of an electric motor and provided on a front upper section of a machine frame 13 (vehicle body frame 13) of the lawn mower 10. The machine frame 13 has left and right front wheels 14 provided on left and right sides of a front section thereof and left and right rear wheels 15 provided on left and right sides of a rear section thereof. The left and right front wheels 14 are steered via a steering wheel 16 provided on a front section of the machine frame 13, and the left and right rear wheels 15 are driven via the power source 12.

As shown in FIGS. 2 to 5, the lawn mower 10 includes a housing 20, a grass clippings delivery passage (cut grass delivery passage) 22, left and right cutting blades 31L and 31R, left and right auxiliary fans 40L and 40R, a grass clippings receptacle (cut grass receptacle) 51, and a chute 52.

Figure 3:
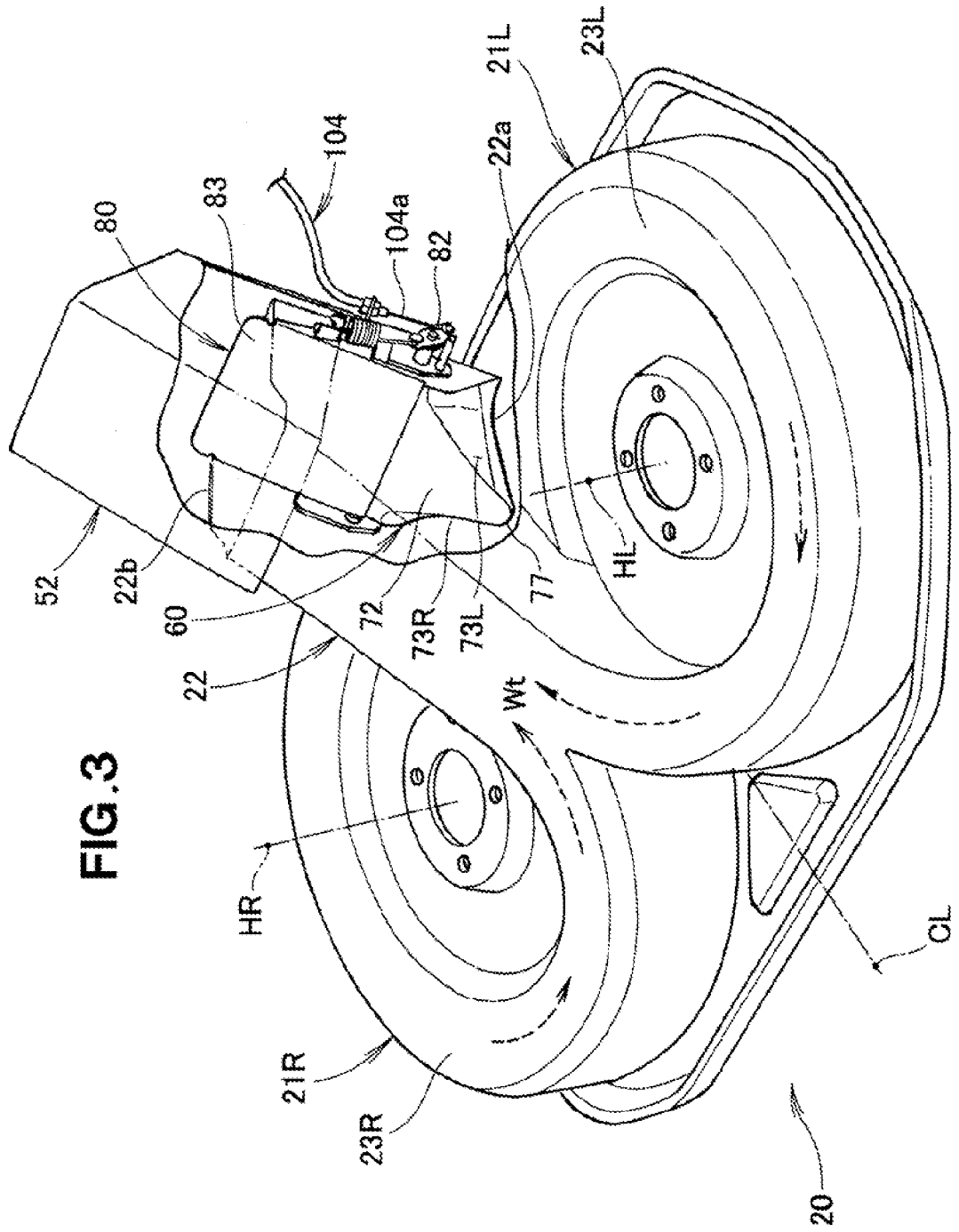
FIG. 3 is a left front upper perspective view of the housing shown in FIG. 1.
Figure 4:
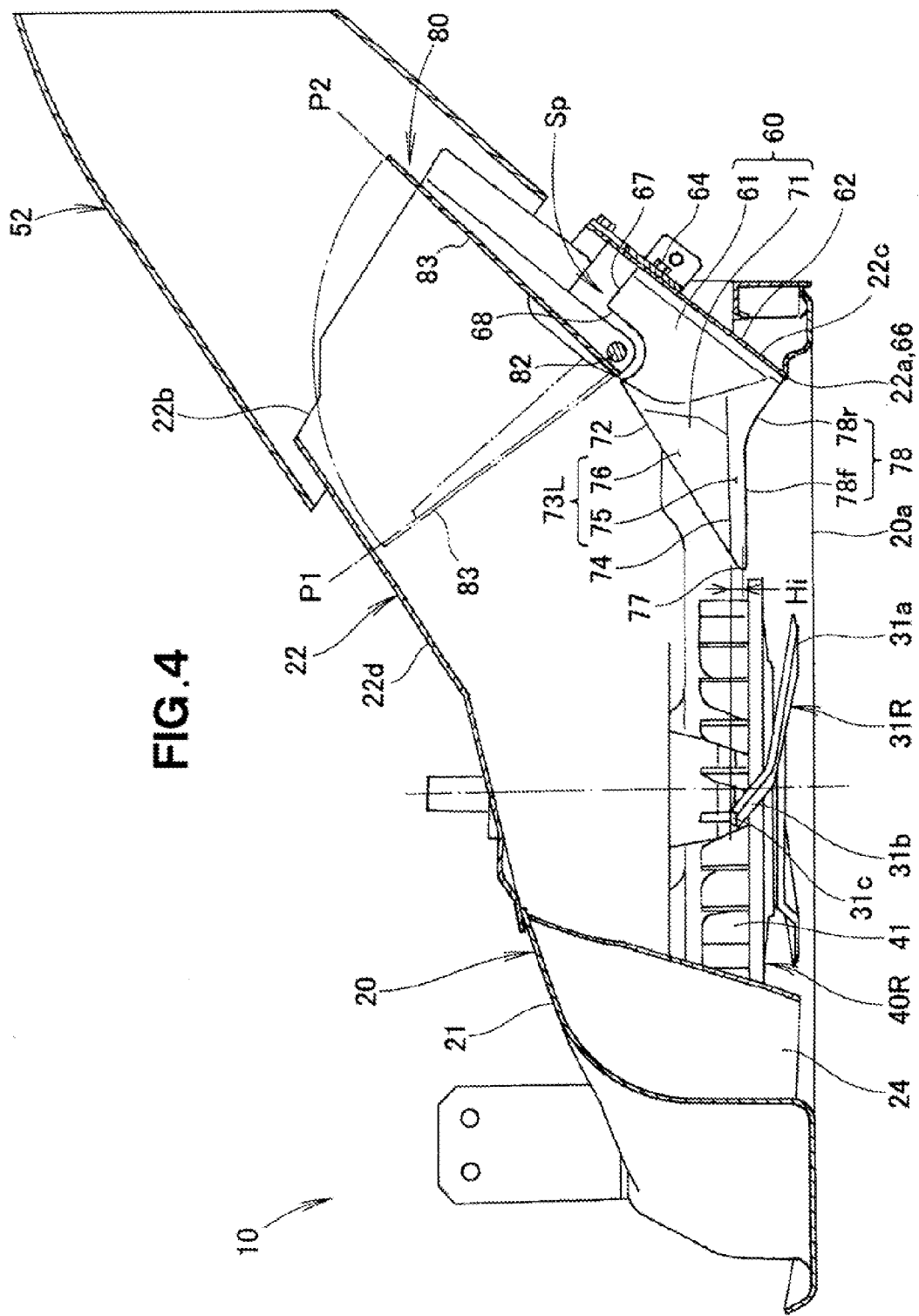
FIG. 4 is a sectional view of the housing, grass clippings delivery passage and chute taken along a widthwise centerline of the lawn mower.
Figure 5:
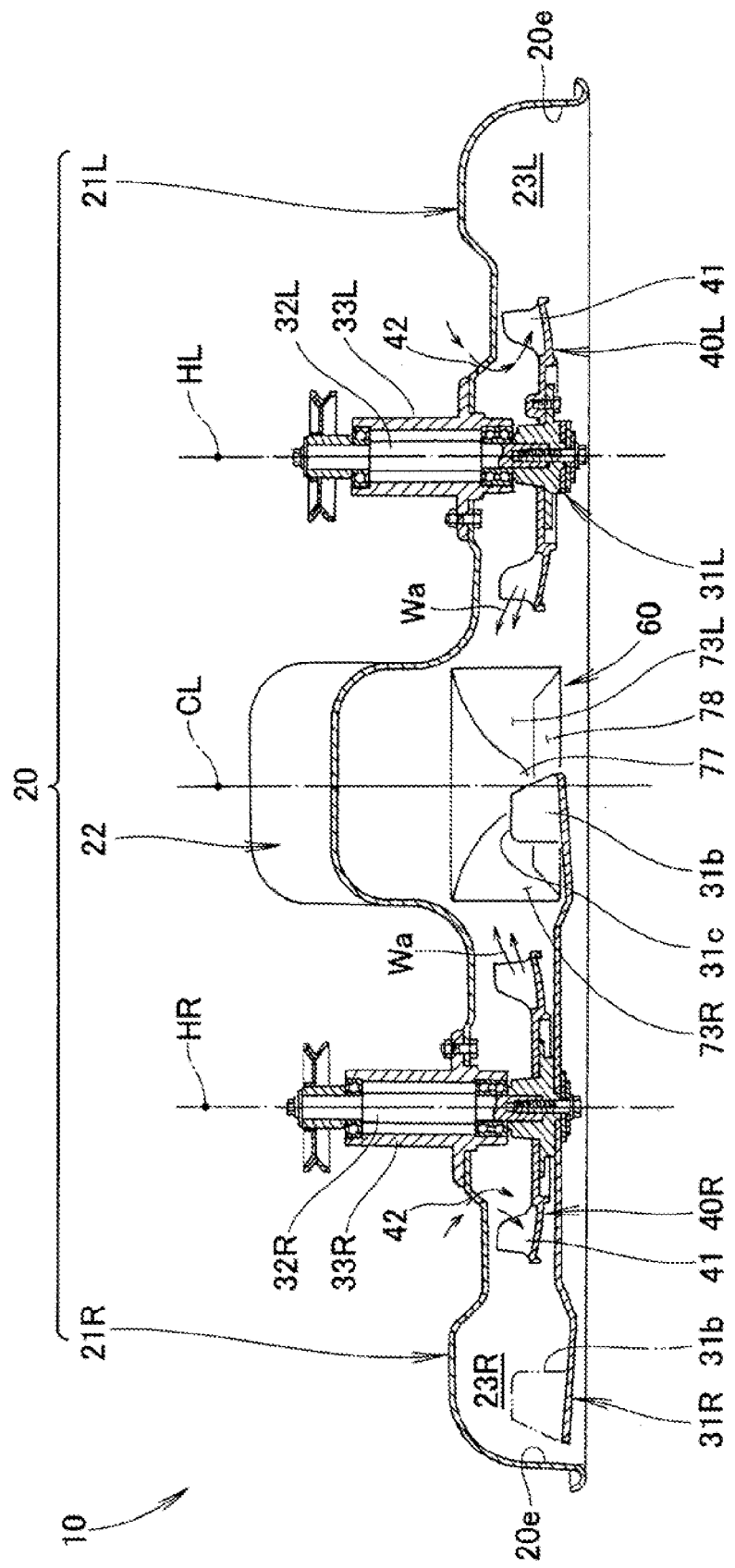
FIG. 5 is a sectional view taken along line 5-5 of FIG. 2.

The housing 20 is disposed centrally on the underside of the machine frame 13. As shown in FIGS. 3 to 5, the housing 20 is formed generally in a laterally-oriented "8" shape as viewed in top plan for accommodating therein left and right cutting blades 31L and 31R, and is open downwardly at its lower side.

Further, the housing 20 is formed in left-right symmetry respect to a centerline CL extending across the width of the housing 20 (i.e., widthwise centerline CL), and it includes a left-half housing section 21L and a right-half housing section 21R and a grass clippings delivery passage 22 extending along the widthwise centerline CL. The left-half housing section 21L accommodates therein the left cutting blade 31L and the left auxiliary fan 40L, while the right-half housing section 21R accommodates therein the right cutting blade 31R and the right auxiliary fan 40R.

Figure 6:
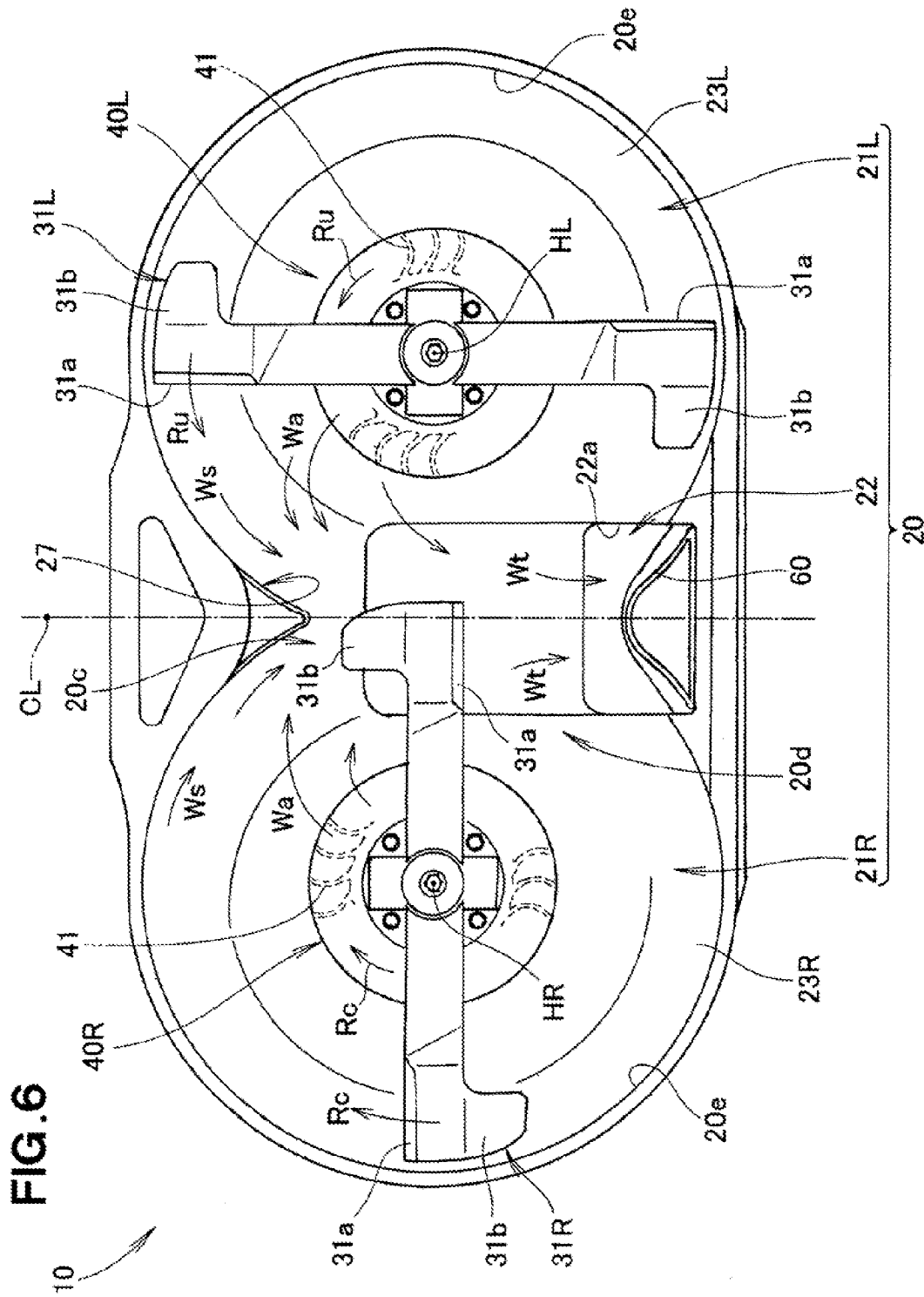
FIG. 6 is a bottom view of the housing, left and right cutting blades and sections around the left and right cutting blades shown in FIG. 5.

Further, as viewed in top plan as in FIGS. 3, 5 and 6, the left-half housing section 21L has a scroll portion 23L gradually protruding upward while winding spirally in a clockwise direction, and the right-half housing section 21R has a scroll portion 23R gradually protruding upward while winding spirally in a counterclockwise direction. Namely, the left-half housing section 21L and the right-half housing section 21R of the housing 20 are spiral cases or scroll cases which include the scroll portions 23L and 23R, respectively, for delivering grass cut by the left and right cutting blades 31L and 31R (grass clippings) toward the grass clippings delivery passage (cut grass delivery passage) 22 while swirling the grass clippings.

The grass clippings delivery passage (cut grass delivery passage) 22 is a passage for delivering the grass, cut by the left and right cutting blades 31L and 31R, from a position on the widthwise center CL to the grass clippings receptacle 51 via the chute 52 by use of grass clippings delivering air (cut grass delivering air), and it is formed in a generally rectangular sectional shape. More specifically, an entrance 22a of the grass clippings delivery passage 22 is open, along the widthwise centerline CL, from a front portion 20c to a rear portion 20d of the inner peripheral surface 20e of the housing 20. Further, the grass clippings delivery passage 22 extends upwardly and rearwardly from the upper spirally-winding ends of the left and right scroll portions 23L and 23R and has, at its rear end, an exit 22b (discharge outlet 22b) connected to the chute 52.

The grass clippings receptacle 51 is provided on a rear section of the machine frame 13 behind the housing 20. The chute 52 connects from the exit 22b at the rear end of the grass clippings delivery passage 22 to the grass clippings receptacle 51. The chute 52 may be dispensed with as desired, in which case the exit 22b of the grass clippings delivery passage 22 may be connected directly to the grass clippings receptacle 51.

Further, as shown in FIGS. 5 and 6, the left and right cutting blades 31L and 31R are accommodated within the housing 20 and rotatable in generally the same plane. More specifically, the housing 20 rotatably supports, via bearings 33L and 33R, a pair of left and right drive shafts 32L and 32R disposed vertically along respective vertical centerlines HL and HR of the left- and right-half housing sections 21L and 21R. Power of the drive source 13 (FIG. 1) is transmitted to the left and right drive shafts 32L and 32R via a transmission member, such as a belt. Within the housing 20, the two drive shafts 32L and 32R have the left and right cutting blades 31L and 31R mounted separately on their respective distal end portions.

Further, the left and right cutting blades 31L and 31R are disposed with a 90° phase difference from each other. The left cutting blade 31L rotates in a counterclockwise direction (i.e., direction of arrow Ru) of FIG. 6 while the right cutting blade 31R rotates in a clockwise direction (i.e., direction of arrow Rc) of FIG. 6, as viewed in bottom plan.

The left cutting blade 31L, which is an elongated blade formed in left-right symmetry with respect to the left drive shaft 32L, has blade sections 31a at its front edges in the rotational direction Ru and air lift sections 31b at its rear edges in the rotational direction Ru. By the left cutting blade 31L rotating in the rotational direction Ru, the blade sections 31a can cut grass, and the air lift sections 31b can generate a flow of swirling air, i.e. swirling air flow Ws (or grass clippings delivering air Ws), in the left scroll portion 23L.

Similarly to the left cutting blade 31L, the right cutting flow 31R has blade sections 31a and air lift sections 31b, and the air lift sections 31b of the right cutting flow 31R can generate a flow of swirling air, i.e. swirling air flow Ws (grass clippings delivering air Ws), in the right scroll portion 23R.

The left and right auxiliary fans 40L and 40R are provided to increase the amount of the grass clippings delivering air Ws generated by the left and right cutting blades 31L and 31R and are disposed immediately over corresponding ones of the left and right cutting blades 31L and 31R within the housing 20.

More specifically, the left auxiliary fan 40L is disposed immediately over the left cutting blade 31L within the left-half housing section 21L and includes a fan rotor 41. The fan rotor 41 includes a multiplicity of blades and is mounted on the left drive shaft 32L. By rotating in the direction of arrow Ru, the left auxiliary fan 40L absorbs external air through an air intake port 42 of the left-half housing section 21L and emits auxiliary grass clippings delivering air Wa.

The right auxiliary fan 40R, which is constructed similarly to the left auxiliary fan 40L, is disposed immediately over the right cutting blade 31RL within the right-half housing section 21R and includes a fan rotor 41. By rotating in the direction of arrow Rc, the right auxiliary fan 40R absorbs external air through an air intake port 42 of the right-half housing section 21R and emits auxiliary grass clippings delivering air Wa.

As shown in FIGS. 4 and 6, the housing 20 includes a delivering air guide section 24 disposed in the front portion 20c of the inner peripheral surface 2e and along the widthwise centerline CL. The delivering air guide section 24 is formed in a generally V shape tapering from a front portion 20b of the inner surface 20a of the housing 20 toward the entrance 22a of the glass clippings delivery passage 22 as viewed in top plan, so as to direct auxiliary grass clippings delivering air Wa, emitted from the left and right auxiliary fans 40L and 40R, to the entrance 22a of the grass clippings delivery passage 22.

Grass clippings can be delivered to the grass clippings receptacle 51 by composite grass clippings delivering air Wt comprising grass clippings main delivering air Ws generated by rotation of the left and right cutting blades 31L and 31R and auxiliary grass clippings delivering air Wa generated by the left and right auxiliary fans 40L and 40R. Note that the left and right auxiliary fans 40L and 40R may be dispensed with as desired. Thus, the term "grass clippings delivering air Wt" may sometimes refer to only the main grass clippings delivering air Ws.

Further, as shown in FIG. 4, the grass clippings delivery passage 22 includes a bottom plate 22c having a flat surface slanting obliquely rearwardly and upwardly from a rear end portion of the housing 20. The front end of the bottom plate 22c is located in the entrance 22a of the grass clippings delivery passage 22. A scroll guide 60 and a shutter mechanism 80 are provided in the entrance 22a of the grass clippings delivery passage 22.

Further, as shown in FIGS. 3 and 4, the scroll guide 60 is a member for directing both grass cut by the left and right cutting blades 31L and 31R (grass clippings) and grass clippings delivering air to the grass clippings delivery passage 22 while swirling the grass clippings and the delivering air within the housing 20. The scroll guide 60 is disposed along the widthwise centerline CL of the housing and in left-right symmetry with respect to the widthwise centerline CL. The scroll guide 60 is an integrally molded component that includes a base section 61 located in the entrance 22a of the grass clippings delivery passage 22 and a guide body 71 extending forward from the base section 61 in a forward tapered shape.

Figure 7:
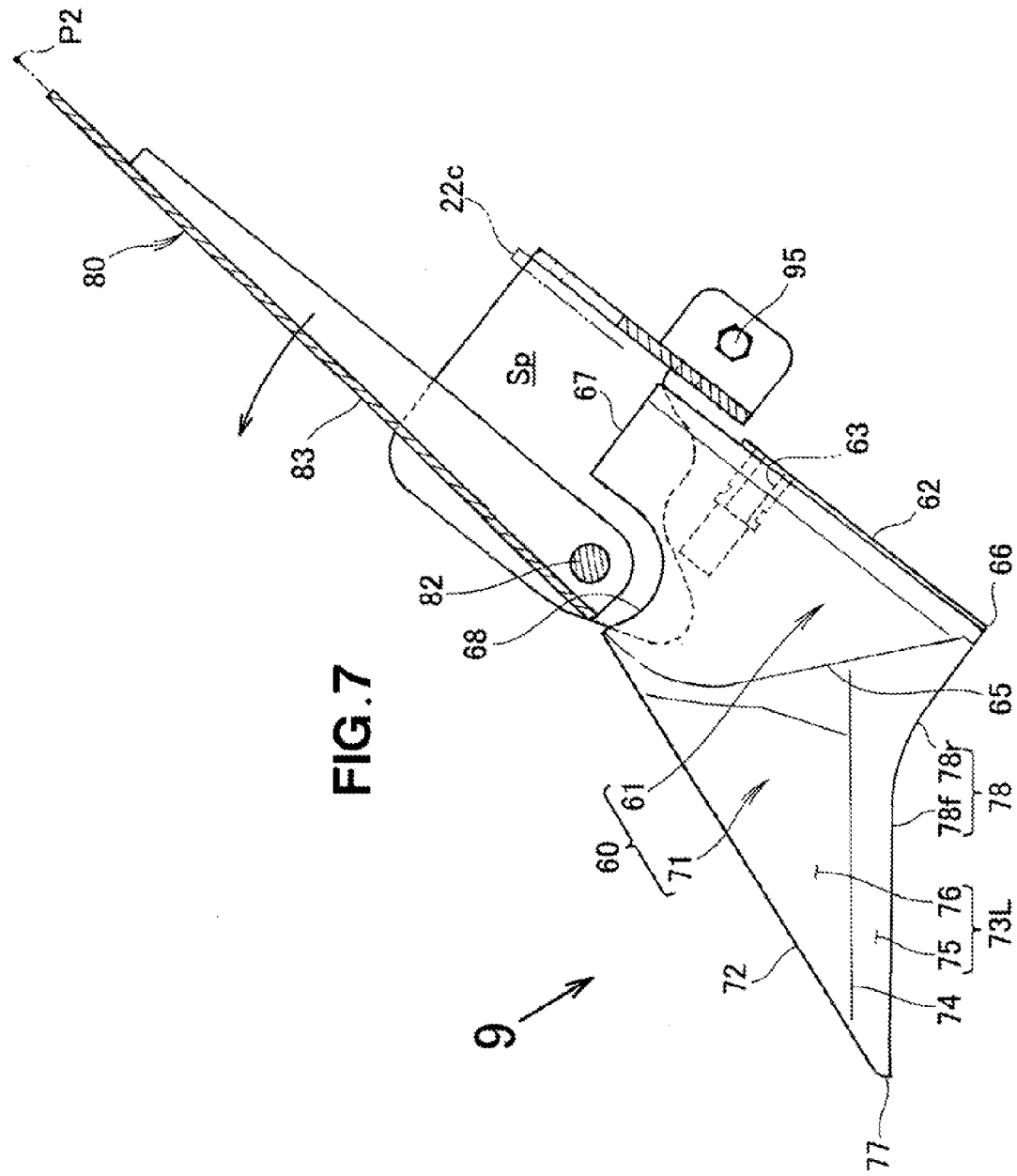
FIG. 7 is an enlarged view of a scroll guide and shutter mechanism shown in FIG. 4.
Figure 8:
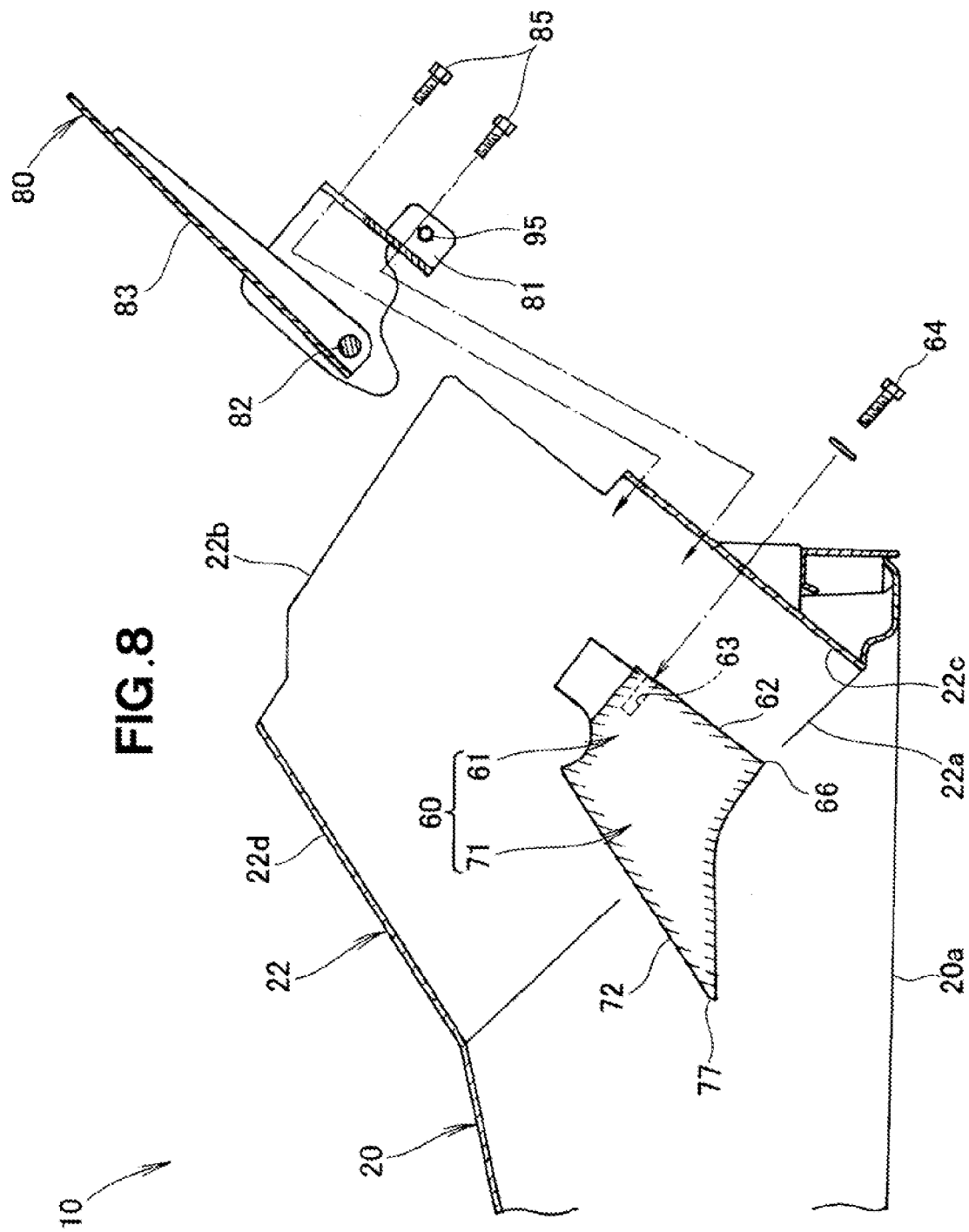
FIG. 8 is an exploded view of the grass clippings delivery passage, scroll guide and shutter mechanism shown in FIG. 4.
Figure 9:
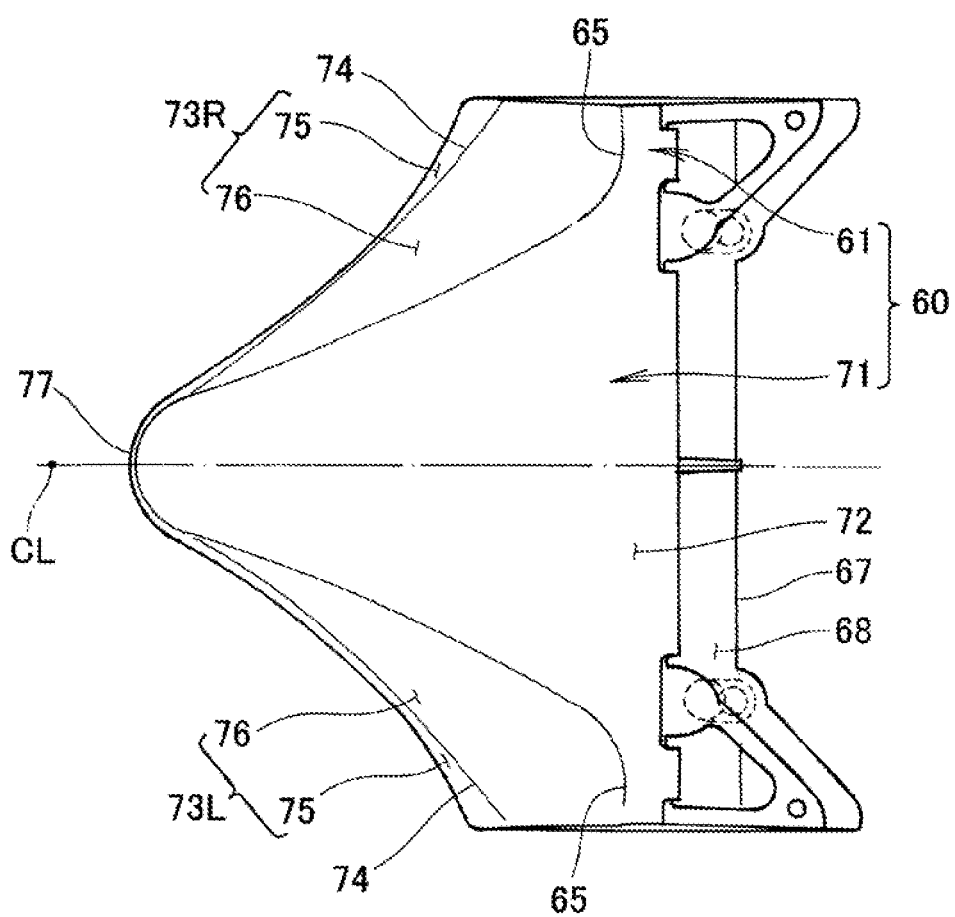
FIG. 9 is a view taken in a direction of arrow 9 of FIG. 7.

Further, as shown in FIGS. 4, 7 and 8, the base section 61 of the scroll guide 60 has a flat bottom surface 62 superposed on the bottom plate 22c of the grass clippings delivery passage 22. A nut 63 is embedded in the bottom surface 62 of the base section 61. The base section 61 is fastened at the bottom surface 62 to the bottom plate 22c of the grass clippings delivery passage 22 by means of the nut 63 and a bolt 64. Thus, the scroll guide 60 is detachably attached to the bottom plate 22c of the grass clippings delivery passage 22.

The guide body 71 has an upper surface 72 slanting generally along the slant of the entrance 22a of the grass clippings delivery passage 22. An inclination angle of the upper surface 72 relative to the lower surface 20a of the housing 20 is set such that the grass clippings delivering air can be smoothly introduced from the housing 20 to the grass clippings delivery passage 22. For example, the inclination angle of the upper surface 72 is set such that the upper surface 72 extends substantially parallel to a top plate 22d of the grass clippings delivery passage 22 slanting rearwardly and upwardly. Further, as shown in FIGS. 3 and 6, left and right side surfaces 73L and 73R are formed in a curved tapered shape generally along the inner surfaces of the left-half housing section 21L and right-half housing section 21R.

The following describe in detail, with reference to FIGS. 4, 7, 9 and 10, the scroll guide 61. An overall shape of the scroll guide 60 as viewed in top plan is a substantial isosceles triangle extending into the housing 20 while tapering forward from the base section 61 (i.e., from the base section 61 toward the front of the lawn mower 10). Further, an overall shape of the scroll guide 60 as viewed laterally in side elevation is a substantial triangle tapering forward from the base section 61. Namely, the guide body 71 is formed in a substantial isosceles triangle as viewed in top plan and in a substantial triangle as viewed laterally in side elevation.

The left and right side surfaces 73L and 73R of the scroll guide 60, i.e. the left and right side surfaces 73L and 73R of the guide body 71, respectively comprise left and right lower slanting surfaces 75 and left and right upper slanting surfaces 76 below and above left and right substantial vertically-middle portions 74. The "substantial vertically-middle portions 74" are height portions near the distal end 77 of the guide body 71.

The left and right lower slanting surfaces 75 and the left and right upper slanting surfaces 76 are each shaped to gradually increase in area in a direction from the distal end 77 of the scroll guide 60, i.e. the distal end 77 of the guide body 71, toward the base section 61. The scroll guide 60 is constructed as follows.

Namely, with the scroll guide 60 attached to the grass clippings delivery passage 22, the left and right lower slanting surfaces 75 extend generally normal to the lower surface 20a (FIG. 4) and have curved surface portions arcuately recessed from the distal end 77 of the scroll guide 60 toward the base section 61.

Further, the left and right upper slanting surfaces 76 slant upwardly from the distal end 77 of the scroll guide 60 toward the base section 61. More specifically, the left and right upper slanting surfaces 76 have curved surface portions arcuately recessed toward the base section 61 while slanting upward from the distal end 77 of the scroll guide 60 toward the base section 61.

The above-mentioned curved surface portions of the slanting surfaces 75 and 76 are each recessed toward the widthwise centerline CL in a generally arcuate shape corresponding to a rotating trajectory of a corresponding one of the left and right cutting blades 31L and 31R. Thus, in the mulching mode, it is possible to reduce a quantity of grass clippings, swirling within the housing 20, falling downward (i.e., fall-down quantity of grass clippings), and thereby enhance the so-called grass retaining characteristic or performance.

As apparent from the foregoing, the scroll guide 60 projects forward from the base section 61 in a substantial isosceles triangle as viewed in top plan and in a substantial triangle as viewed laterally in side elevation. Therefore, when the lawn mower 10 is in the mulching mode, it is possible to prevent grass clippings, swirling within the housing 20, from falling down onto undesired portions.

Namely, in the mulching mode, the left and right lower slanting surfaces 75 extend generally normal to the lower surface 20a of the housing 20 in order to adjust the fall-down quantity of the grass clippings swirling within the housing 20. Thus, in the mulching mode, the grass clippings swirling within the housing 20 can be caused to smoothly swirl by means of the left and right side surfaces 73L and 73R as well.

The left and right upper slanting surfaces 76, on the other hand, slant upward from the distal end 77 of the scroll guide 60 toward the base section 61. Namely, the left and right upper slanting surfaces 76 are twisted surfaces relative to the upper ends of the left and right lower slanting surfaces 75. More specifically, the left and right upper slanting surfaces 76 formed as twisted surfaces in order to achieve both (1) enhancement of a grass delivery efficiency with which to discharge grass clippings from the housing 20 to the grass clippings delivery passage 22 in the bagging mode and (2) enhancement of the so-called grass retaining characteristic with which to adjust the fall-down quantity of the grass clippings swirling within the housing 20 in the mulching mode.

In the aforementioned manner, the instant embodiment of the lawn mower 10 can achieve an enhanced grass delivery efficiency in the bagging mode and an enhanced grass retaining characteristic in the mulching mode.

Figure 10:
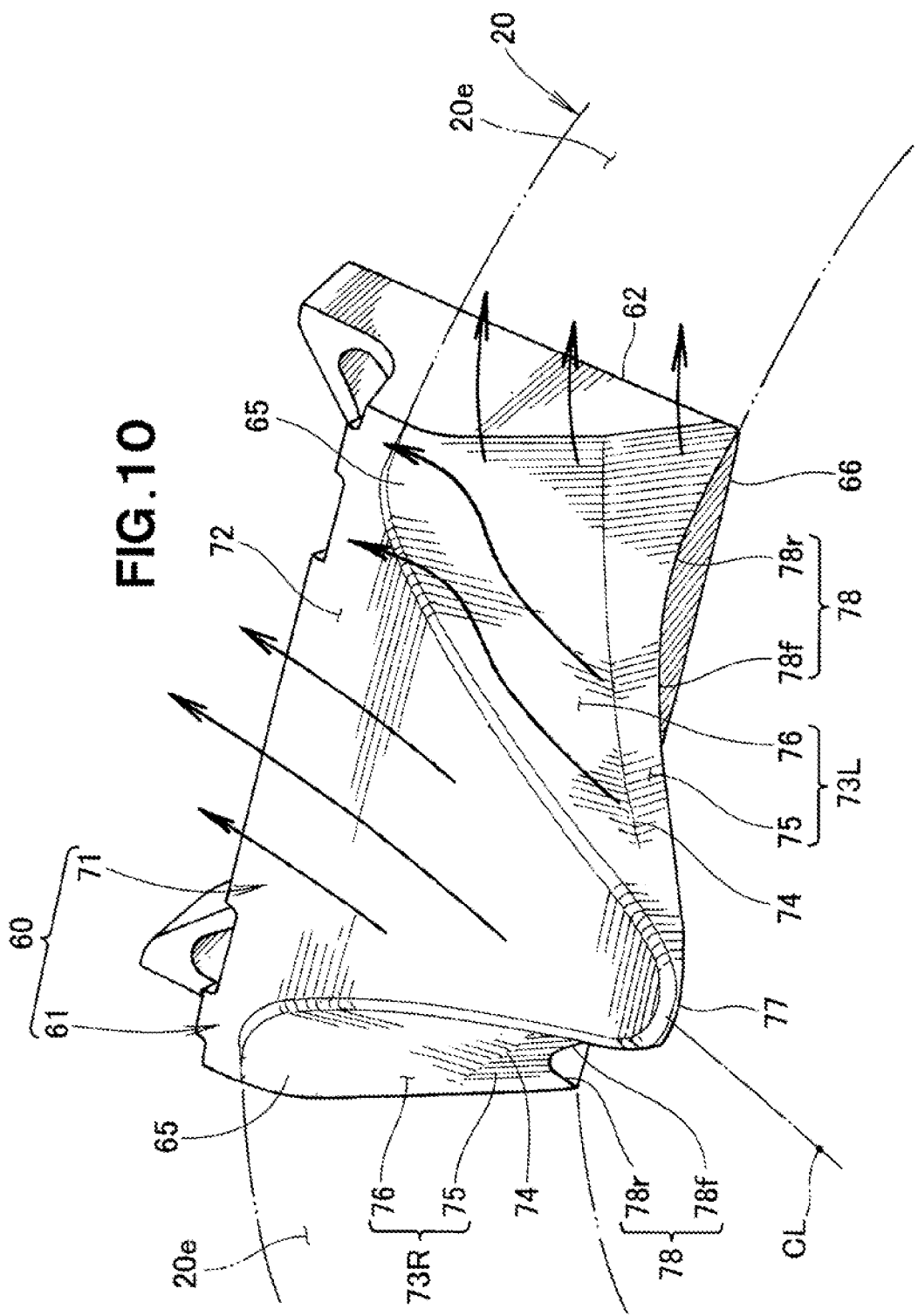
FIG. 10 is a perspective view of the scroll guide shown in FIG. 7.

Of the base section 61 of the scroll guide 60, surfaces 65 facing radially inward of the housing 20, i.e. inwardly facing surfaces 65, are shaped to extend along the circular inner peripheral surface 20e (FIG. 10). The inwardly facing surfaces 65 are formed continuously or integrally with proximal end portions of the left and right side surfaces 73L and 73R, so that grass clippings are allowed to swirl even more smoothly within the housing 20.

Further, of the scroll guide 60, the lower surfaces 78 (inner bottom surfaces 78) located within the housing 20, more specifically at least rear half portions 78r of the lower surfaces 78 of the guide body 71, slant toward the base section 61. More specifically, the lower surfaces 78 of the guide body 71 each include the rear half portion 78r adjacent to the base section 61 and a front half portion 78f located forward of the rear half portion 78r. The front half portion 78f extends substantially parallel to the lower surface 20a of the housing 20 and located higher than the lower end 66 of the base section 61. The rear half portion 78r curvingly slants rearwardly and downwardly from the rear end of the front half portion 78f to the lower end 66 of the base section 61.

Because at least the rear half portions 78r of the lower surfaces 78 of the guide body 71 slant downward the lower end 66 of the base section 61, a swirling current fo (air current fo) within the housing 20 is insusceptible to swirling resistance. Thus, grass clippings swirling within the housing 20 can smoothly swirl without meeting swirling resistance from the lower surface 78 of the scroll guide 60.

Figure 11:
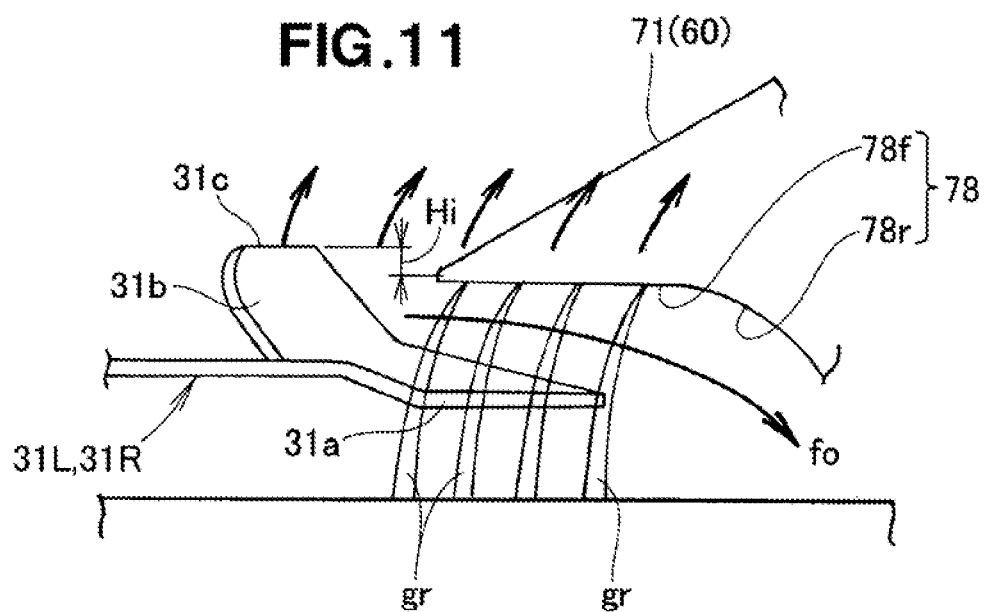
FIG. 11 is a view explanatory of relationship between the cutting blades and the scroll guide shown in FIG. 4.

Further, as shown in FIGS. 4, 5 and 11, the distal end 31c of each of the left and right cutting blades 31L and 31R (i.e., upper end 31c of the air lift section) is located higher by a height Hi than the distal end 77 of the scroll guide 60. Thus, grass clippings swirling within the housing 20 is less likely to be subjected to resistance by the distal end 77 of the scroll guide 60, so that grass retaining performance or characteristic can be enhanced.

Further, in this case, turbulence is less likely to occur in a swirling flow Fo as compared to a case where no height difference is provided between the distal end 31c of the left and right cutting blades 31L and 31R and the distal end 77 of the scroll guide 60. Besides, a rising air current is generated by the air lift sections 31b within the housing 20 as the left and right cutting blades 31L and 31R rotate. Namely, negative pressure is generated over the left and right cutting blades 31L and 31R, so that grass gr (FIG. 11) growing on the ground surface becomes easier to stand up by virtue of the negative pressure. Thus, the grass gr can be cut or clipped with an increased reliability, leaving fewer grass gr undesirably uncut. As a result, enhanced grass cutting performance can be achieved.

Figure 12:
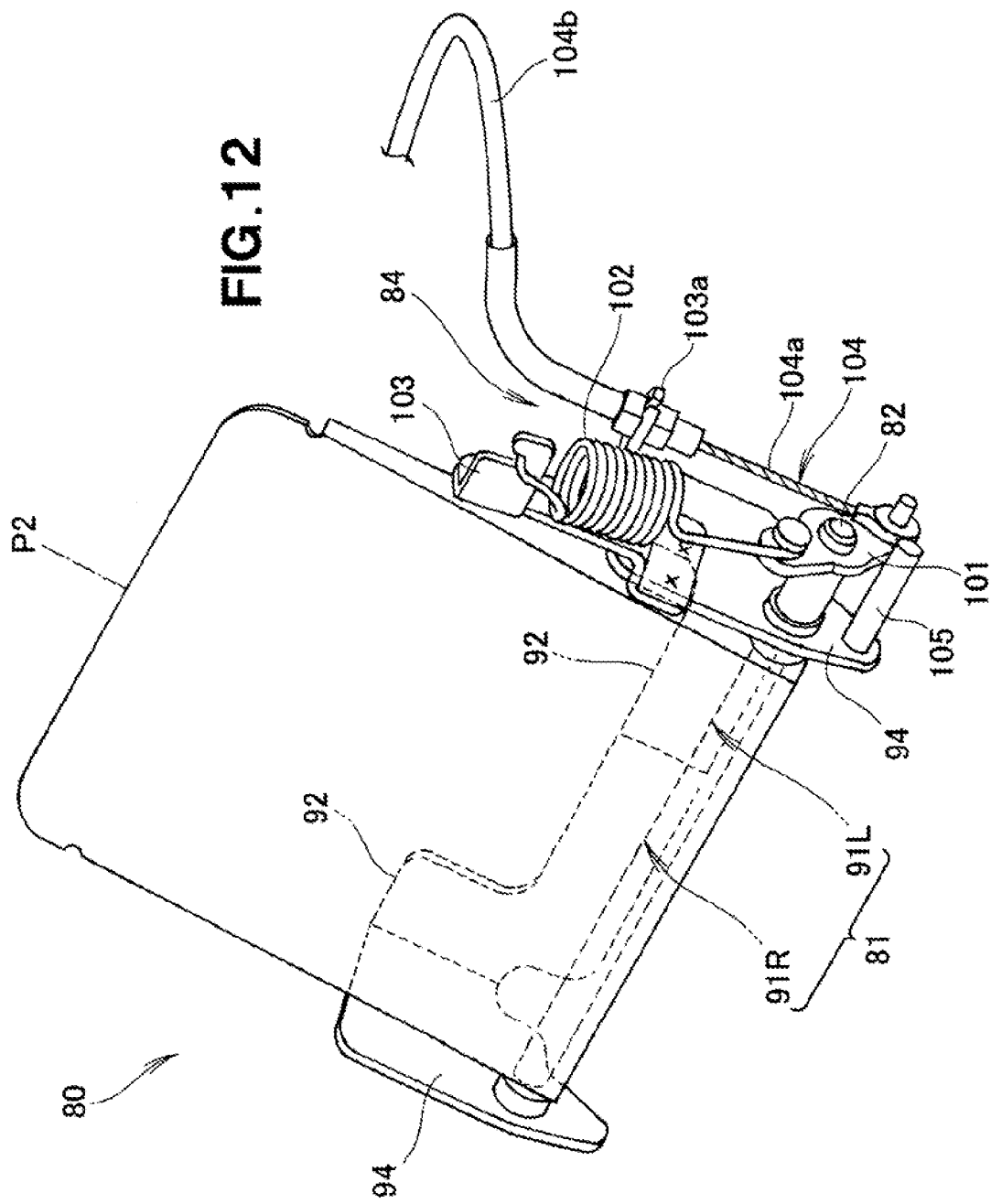
FIG. 12 is a perspective view of the shutter mechanism shown in FIG. 3.
Figure 13:
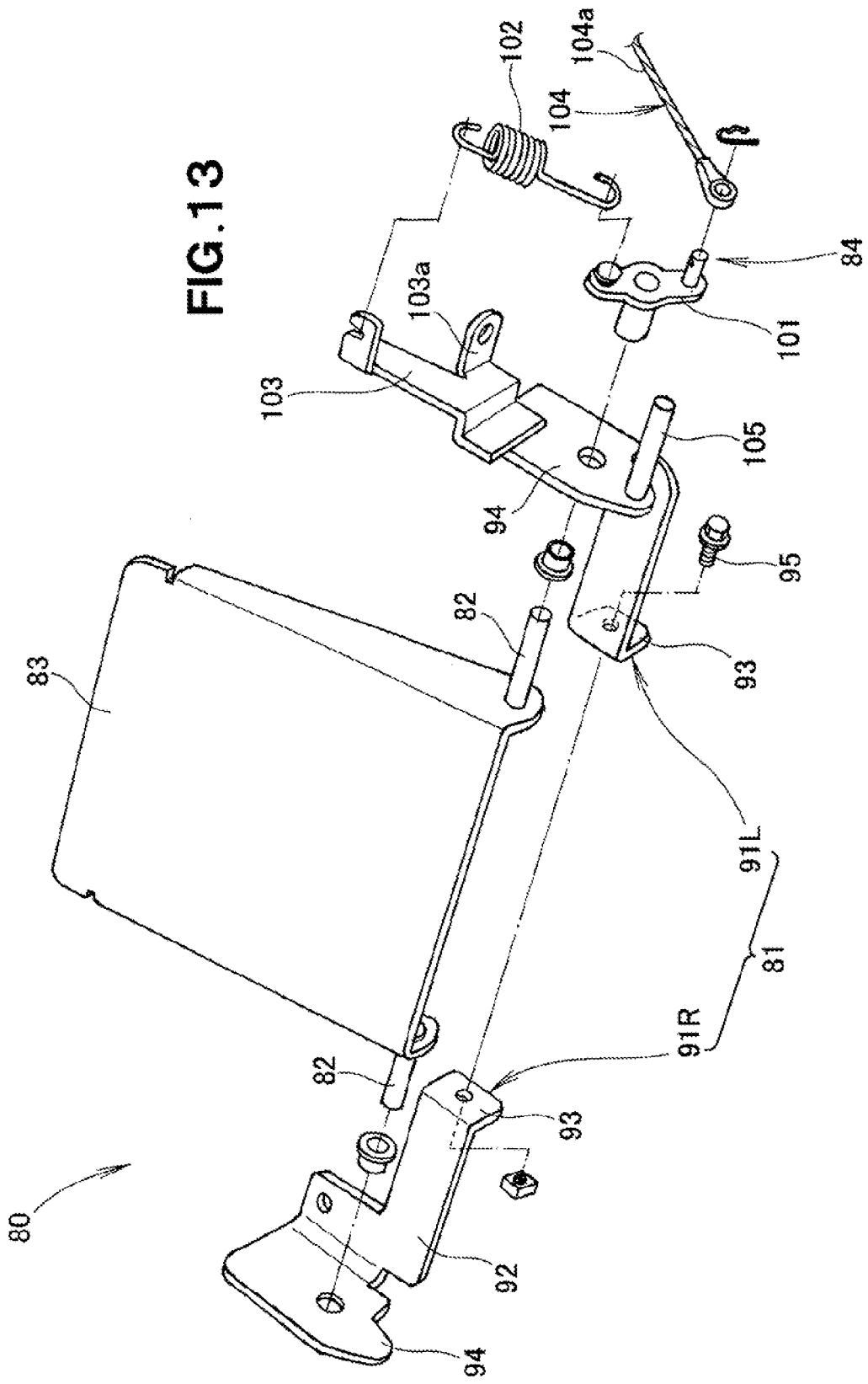
FIG. 13 is an exploded view of the shutter mechanism shown in FIG. 12.

The following describe, with reference to FIGS. 4, 7, 12 and 13, the shutter mechanism 80. The shutter mechanism 80 is an opening/closing mechanism which is detachably mounted on a lower portion of the grass clippings delivery passage 22, and the shutter mechanism 80 is capable of opening and closing the grass clippings delivery passage 22. More specifically, the shutter mechanism 80 is located immediately behind or rearward of the scroll guide 60, i.e. adjacent to the rear end of the scroll guide 60. The shutter mechanism 80 is constructed as a single unit that includes a base 81, pivot shaft 82, a shutter plate 83 and an operating force transmission section 84 as shown in FIG. 12.

The base 81 is a member mounted on a lower portion of the grass clippings delivery passage 22 and comprises left and right base halves 91L and 91R separable from each other in a width direction of the base 81. In a front view of the shutter mechanism 80, the left and right base halves 91L and 91R are each of a substantially L shape, and the substantially L shapes of the right base halves 91L and 91R are horizontally opposed to each other. Each of the left and right base halves 91L or 91R is a member formed by bending a steel plate and has a horizontal plate portion 92 elongated in the width direction of the base 81, a flange portion 93 extending downward from the inner end, in the width direction, of the horizontal plate portion 92 and opposed to the flange portion 93 of the other base halve, and a vertical plate portion 94 extending upward from the outer end, in the width direction, of the horizontal plate portion 92 and opposed to the vertical plate portion 94 of the other base halve 91R or 91L. The base 81 is assembled together by the flange portions 93 of the left and right base halves 91L and 91R being superposed on each other and fastened together by means of a bolt 95.

Preferably, the pivot shaft 82 comprises a pair of horizontal shaft members 82 disposed on a lower portion of the grass clippings delivery passage 22 and pivotably supported at its opposite end portions by the vertical plates 94 of the left and right base halves 91L and 91R. The pivot shaft members 82 are provided on opposite lower end portions of the shutter plate 83.

The shutter plate 83 is a flat plate-shaped member pivotable about the pivot shaft 82 for opening or closing the grass clippings delivery passage 22. Namely, the shutter plate 83 is pivotable between a fully closed position P1 for closing the grass clippings delivery passage 22 to execute the mulching mode and a fully opened position P2 where it is laid down toward the discharge side of the grass clippings delivery passage 22 to execute the bagging mode. The shutter plate 83 is operable between the fully closed position P1 and the fully opened position P2 via an operation section 110 (FIG. 1) located remote from the shutter mechanism 80.

The operating force transmission section 84 is a mechanism for transmitting opening/closing operation force, given via the operation section 110, to the shutter plate 83. The operating force transmission section 84 includes: a pivot arm 101 mounted on one of the pivot shaft members 82 for limited relative pivoting movement; a return spring 102 normally urging the shutter plate 83 toward the opened position; and an engagement section 103 that hooks one end of the return spring 102.

The swing arm 101 is a plate-shaped bar that, when the shutter mechanism 80 is assembled, is mounted on the one pivot shaft 82 to extend in opposite direction from the pivot shaft 82. The other end of the return spring 102 is hooked by one end portion of the swing arm 101. Further, an inner wire 104a of a wire cable 104 is connected at one end portion to another end portion of the pivot arm 101, and an outer tube 104b covering the inner tube 104a is fixed at one end portion to a fastening portion 103a of the engagement section 103.

The return spring 102 is in the form of a tension spring. The engagement section 103 is integrally provided on one of the left and right vertical plates 94, and the one vertical plate 94 has a stopper 105. The stopper 105 is a member that defines the fully closed position P2 of the shutter plate 83, and, in the fully closed position P2 of the shutter plate 83, the other end portion of the swing arm 101 is abutted by the stopper 105.

Further, as shown in FIG. 7, the pivot shaft 82 and the shutter plate 83 are disposed with a space Sp from the bottom plate 22c (bottom surface) of the grass clippings delivery passage 22. Namely, a height at which the pivot shaft 82 is supported by the base 81 is set in such a manner as to form the space Sp.

Further, when the shutter plate 83 is in the fully opened position, as shown in FIGS. 4 and 7, the shutter plate 83 extends generally in flush with the upper surface 72 of the scroll guide 60, which allows the grass clippings delivering air to flow smoothly. A downwardly-recessed stepped section 68 for accommodating therein the pivot shaft 82 of the shutter mechanism 80 is formed at the rear end 67 of the base section 61. More specifically, the stepped section 68 is formed by recessing an upper corner portion of the rear end 67 in a generally semi-circular shape.

Further, as shown in FIG. 8, the unitized shutter mechanism 80 is inserted onto the bottom plate 22c, for example, from behind the passage, or superposed on the bottom plate 22c from below or above the bottom plate 22c. Then, the unitized shutter mechanism 80 can be assembled or attached to the grass clippings delivery passage 22 by the base 81 being fastened to the bottom plate 22c by means of a bolt 85. Then, the unitized shutter mechanism 80 can be disassembled or detached from the grass clippings delivery passage 22 by the base 81 being detached from the bottom plate 22c. Therefore, a cleaning operation of the shutter mechanism 80 can be simplified.

Further, as shown in FIG. 1, the operation section 110 for operating the shutter mechanism 80 is disposed near the seat 11 of the riding lawn mower 10. Namely, an operating lever 115 of the operation section 110 is disposed at a position operable by a hand, e.g. left hand, of the human operator seated in the seat 11.

Figure 14:
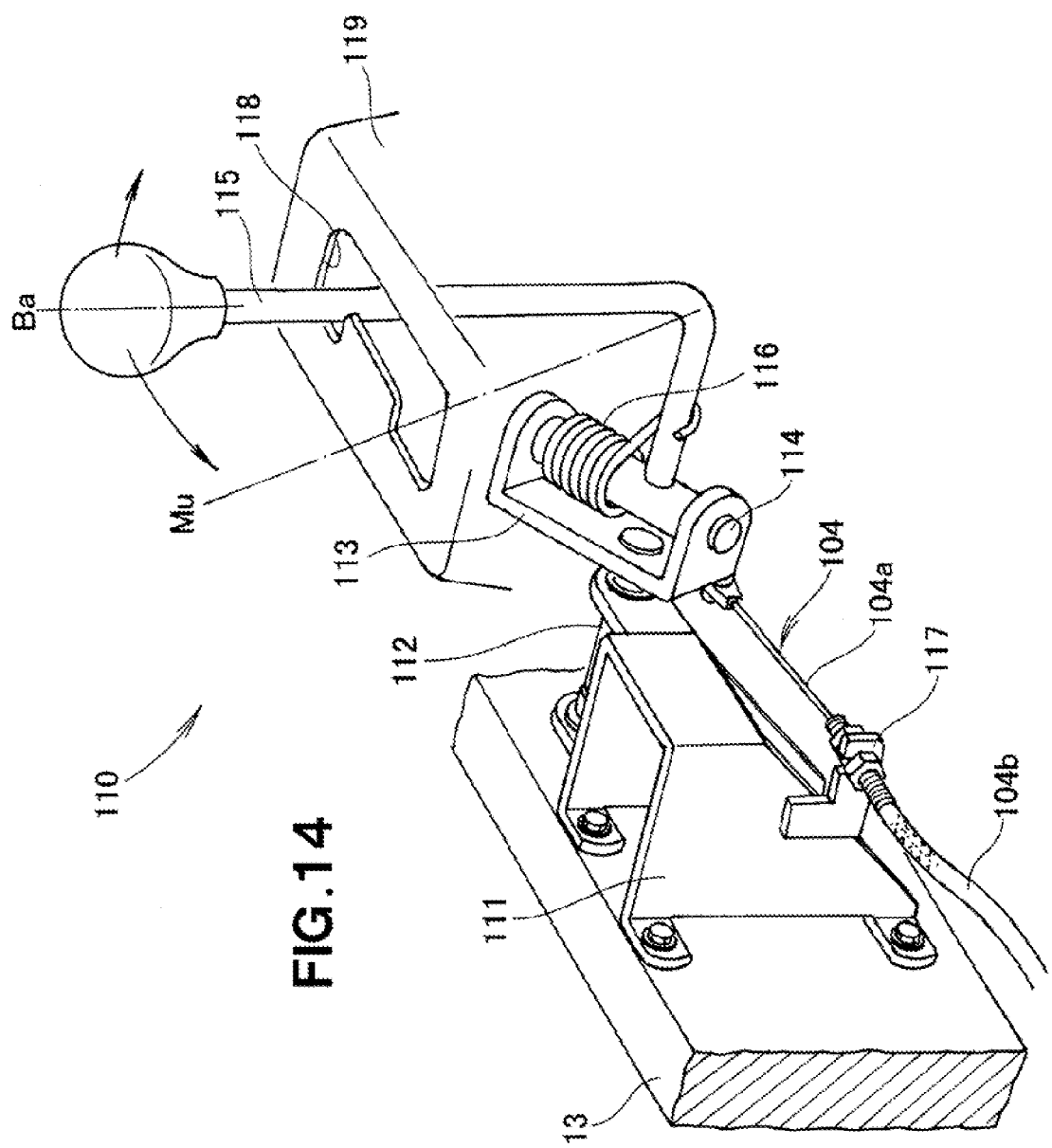
FIG. 14 is a perspective view of an operation section shown in FIG. 1.
Figure 15:
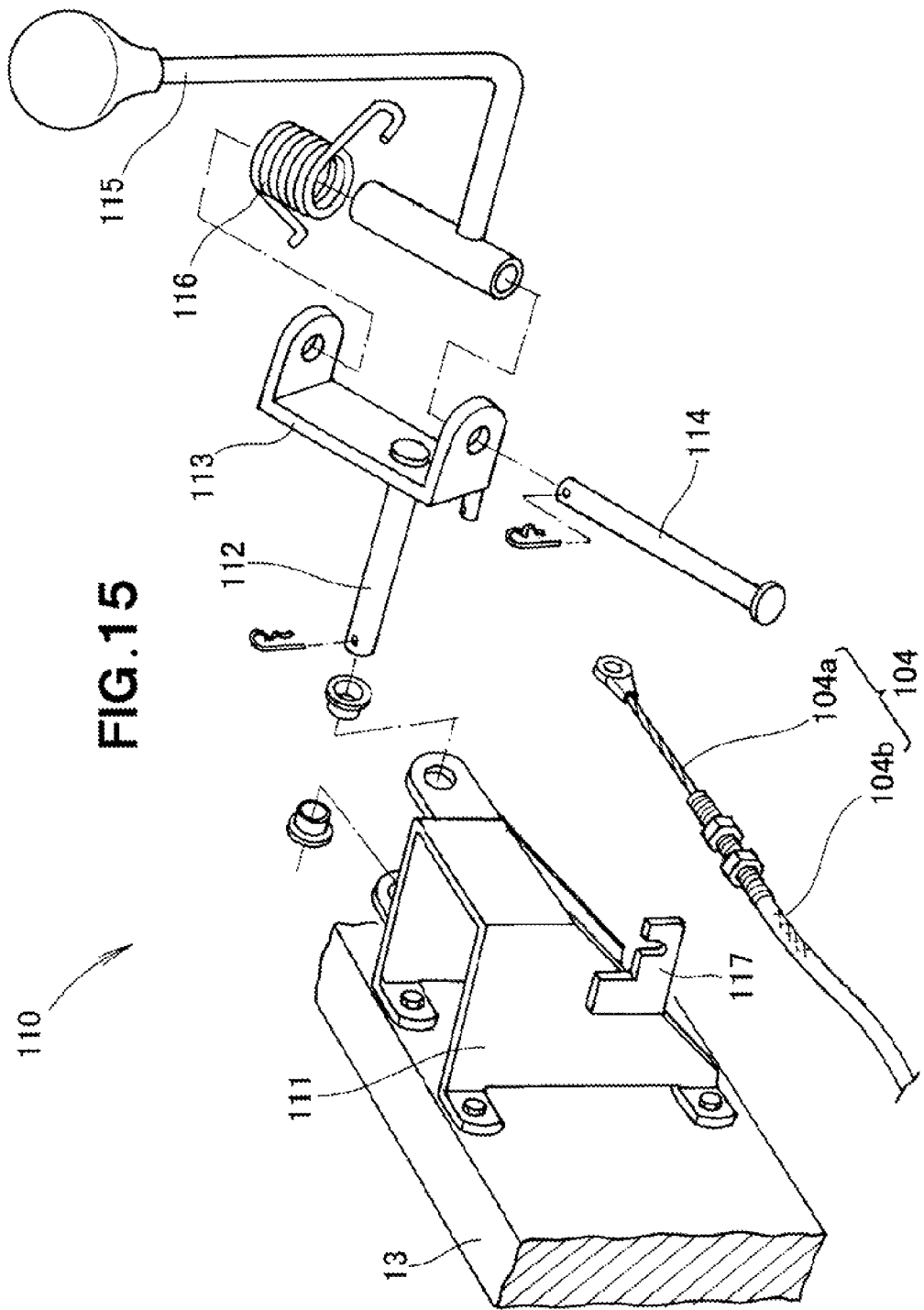
FIG. 15 is an exploded view of an operation section shown in FIG. 14.

Further, as shown in FIGS. 14 and 15, the operation section 110 includes: a bracket 111 fixed to the machine frame 13; a first shaft 112 rotatably supported at opposite ends on the bracket 111; a pivot arm 113 mounted on the first shaft 112; a second shaft 114 mounted at opposite ends on the pivot arm 113; the operating lever 115 pivotably supported on the second shaft 114; and a return spring 116 for normally urging the operating lever 115.

The first shaft 112 is rotatable in a front-rear direction of the machine frame 13, so that the pivot arm 113 is also rotatable in the front-rear direction of the machine frame 13. The inner wire 104a of the wire cable 104 is connected at its other end portion to one end portion of the pivot arm 113, and the other end portion of the outer tube 104b covering the inner tube 104a is fastened to the fastening portion 117 of the bracket 111.

The operating lever 115 is pivotable relative to the pivot arm 113 in a direction perpendicular to the first shaft 112, i.e. in a width direction (vertical direction in FIG. 14) of the machine frame 13. The operating lever 115 has its proximal end portion covered with a cover 119 having a generally crank-shaped guide groove 18 as viewed in top plan. The return spring 116 is in the form of a torsion spring and normally urges the operating lever 115 inward in the width direction of the machine frame 13.

Usually, the operating lever 115 is held in a generally upright or stand-up bagging position as shown in FIG. 14. In this state, the shutter plate 83 shown in FIG. 4 is held in the fully opened position P2 for fully opening the grass clippings delivery passage 22, so that the lawn mower 10 is allowed to operate in the bagging mode.

Then, as necessary, the operating lever 115 is shifted forward and downward over to a mulching position Mu while being guided along the crank-shaped guide groove 18. At that time, the pivot arm 113 pivots counterclockwise in FIG. 14 to thereby pull the inner wire 104a. Thus, the pivot arm 101 pivots counterclockwise in FIG. 12, so that the shutter plate 83 pivots counterclockwise in FIG. 12 to thereby stand up. In this manner, the shutter plate 83 stands up to the fully closed position P1 as indicated by imaginary line in FIG. 4, to thereby fully close the grass clippings delivery passage 22. As a result, the lawn mower 10 can be switched from the bagging mode to the mulching mode.

Then, as necessary, the operating lever 115 shown in FIG. 14 is shifted rearward and downward over to a bagging position Ba while being guided again along the crank-shaped guide groove 18. Thus, the lawn mower 10 is switched to the bagging mode Ba, and the shutter plate 83 can be shifted back to the fully opened position P2 as indicated by solid line in FIG. 4. As a result, the lawn mower 10 can be switched from the mulching mode back to the bagging mode.

The description about the shutter mechanism 80 constructed in the aforementioned manner can be summarized as follows. The shutter mechanism 80 employed in the instant embodiment is of a so-called front hinge type where the pivot point (pivot shaft 82) of the shutter plate 83 is disposed on a front portion of the shutter plate 83. Because the shutter mechanism 80 is of such a front hinge type, the hinge section (i.e., pivot shaft 82 and support portions for the pivot shaft members 82) of the shutter mechanism 80 and other component parts around the hinge section are located near the entrance 22a of the grass clippings delivery passage 22. Because the entrance 22a is connected to the housing 20, the grass clippings delivering air Wt (Ws) has a relatively great force in the neighborhood of the entrance 22a, so that grass clippings are less likely to fall on and around the hinge section. Even in case grass clippings have fallen and accumulated on and around the hinge section, they can be easily blown away by the strong grass clippings delivering air Wt (Ws). Thus, it is possible to effectively prevent unwanted jamming of grass clippings in the shutter mechanism 80, particularly in the hinge section, as a result of which the instant embodiment can minimize the frequency of maintenance/inspection and cleaning operations to be performed on the shutter mechanism 80.

Further, because the shutter mechanism 80 is a unitized mechanism (constructed as a single unit), it can be detachably attached together as the unit to the grass clippings delivery passage 22. Thus, at the time of maintenance/inspection or cleaning operations, the shutter mechanism 80 can be easily and simply detached and attached from and to the grass clippings delivery passage 22. As a result, maintenance/inspection and cleaning operations can be performed with ease on the shutter mechanism 80 and the interior of the grass clippings delivery passage 22.

Furthermore, the pivot shaft 82 and the shutter plate 83 are disposed with the space Sp from the bottom plate 22c (bottom surface 22c) of the grass clippings delivery passage 22. Generally, as the cutting blades 31L and 31R stop rotating, the grass clippings delivering air Wt (Ws) stops being generated, and thus, grass clippings would fall and accumulate on the bottom surface 22c of the grass clippings delivery passage 22 and on and around the hinge section. However, by the provision of the above-mentioned space Sp, grass clippings are less likely to accumulate on the pivot shaft 82 and the shutter plate 83 and jam in the shutter mechanism 80.

Furthermore, the downwardly-recessed stepped section 68 for accommodating therein the pivot shaft 82 of the shutter mechanism 80 is formed in the rear end 67 of the scroll guide 60 provided in the entrance 22a of the grass clippings delivery passage 22. Thus, when the shutter plate 83 is in the fully opened position P2 where it is laid down toward the discharge side (output side) of the grass clippings delivery passage 22, the hinge section does not project into the grass clippings delivery passage 22. Namely, the shutter mechanism 80 has no stepped section in and around the hinge section. Thus, even when grass cuttings have fallen on the bottom surface 22c of the grass clippings delivery passage 22, they do not accumulate on the bottom surface 22c because they can be easily blown away by the grass clippings delivering air Wt (Ws). Thus, it is possible to effectively prevent jamming of grass clippings in the hinge section, as a result of which the instant embodiment can even further minimize the frequency of maintenance/inspection and cleaning operations. Besides, because the shutter mechanism 80 has no stepped section in and around the hinge section, any particular construction is not required to eliminate a stepped section from the hinge section.

Now, a description will be given about behavior of the scroll guide 60 in the case where the lawn mower 10 is used selectively in any desired one of the bagging mode and mulching mode as necessary.

Figure 16:
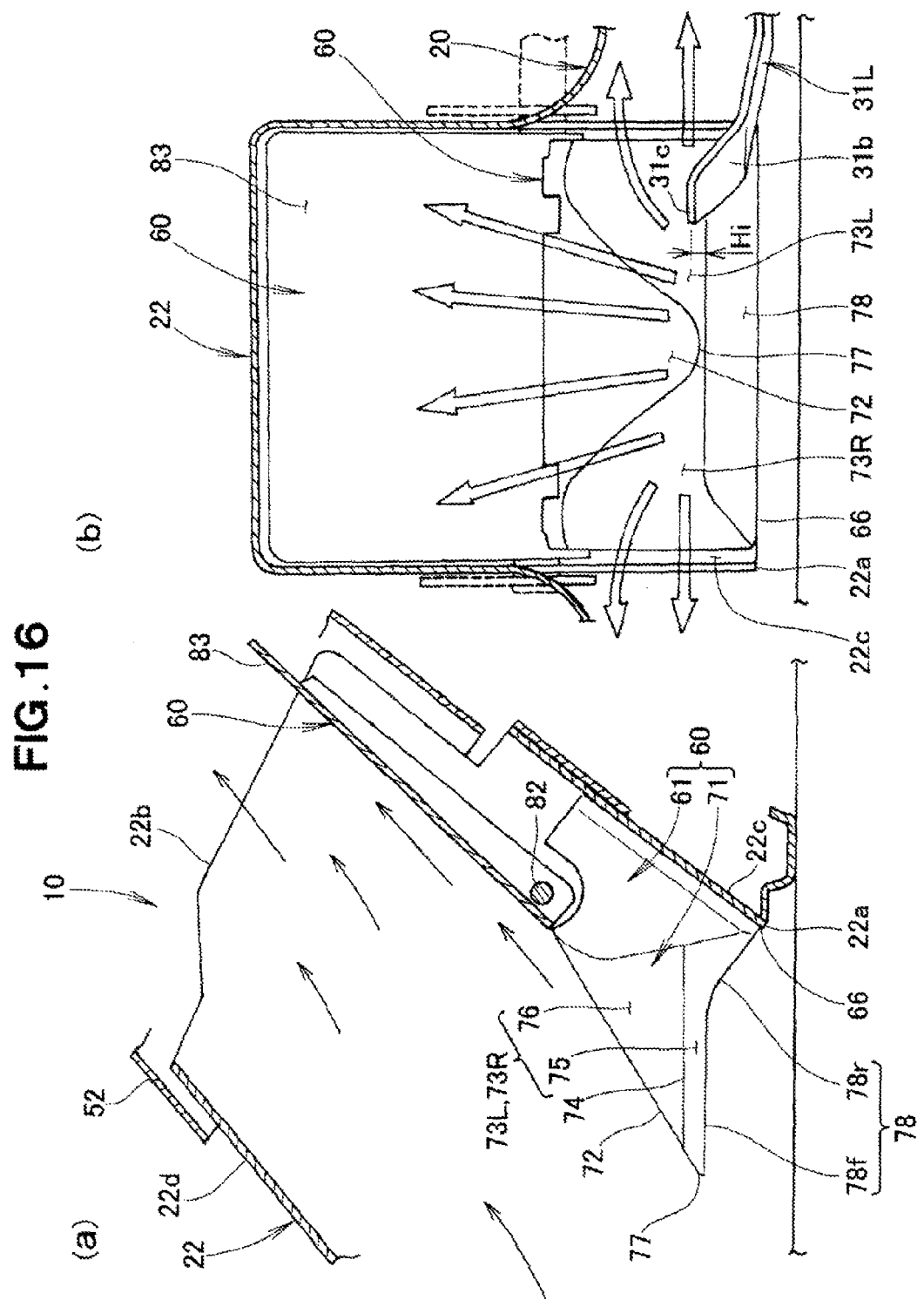
FIG. 16 illustrates behavior of the scroll guide and shutter mechanism shown FIG. 4 when the lawn mower is in a bagging mode.

FIG. 16(a) shows flows of grass clippings delivering air and grass clippings in the case where the lawn mower 10 is used in the bagging mode, and FIG. 16(b) shows flows of grass clippings delivering air and grass clippings as viewed from the entrance 22a of the grass clippings delivery passage 22.

As shown in FIGS. 6, 16(a) and 16(b), the grass clippings delivery passage 22 is kept opened while the lawn mower 10 is in the bagging mode. Grass cut by the left and right cutting blades 31L and 31R (i.e., grass clippings) are directed to the upper surface 72 of the scroll guide 60 and the shutter plate 83 while swirling within the housing 20 and then flow along the grass clippings delivery passage 22. Thus, the grass clippings swirling within the housing 20 can be efficiently delivered to the grass clippings delivery passage 22.

Figure 17:
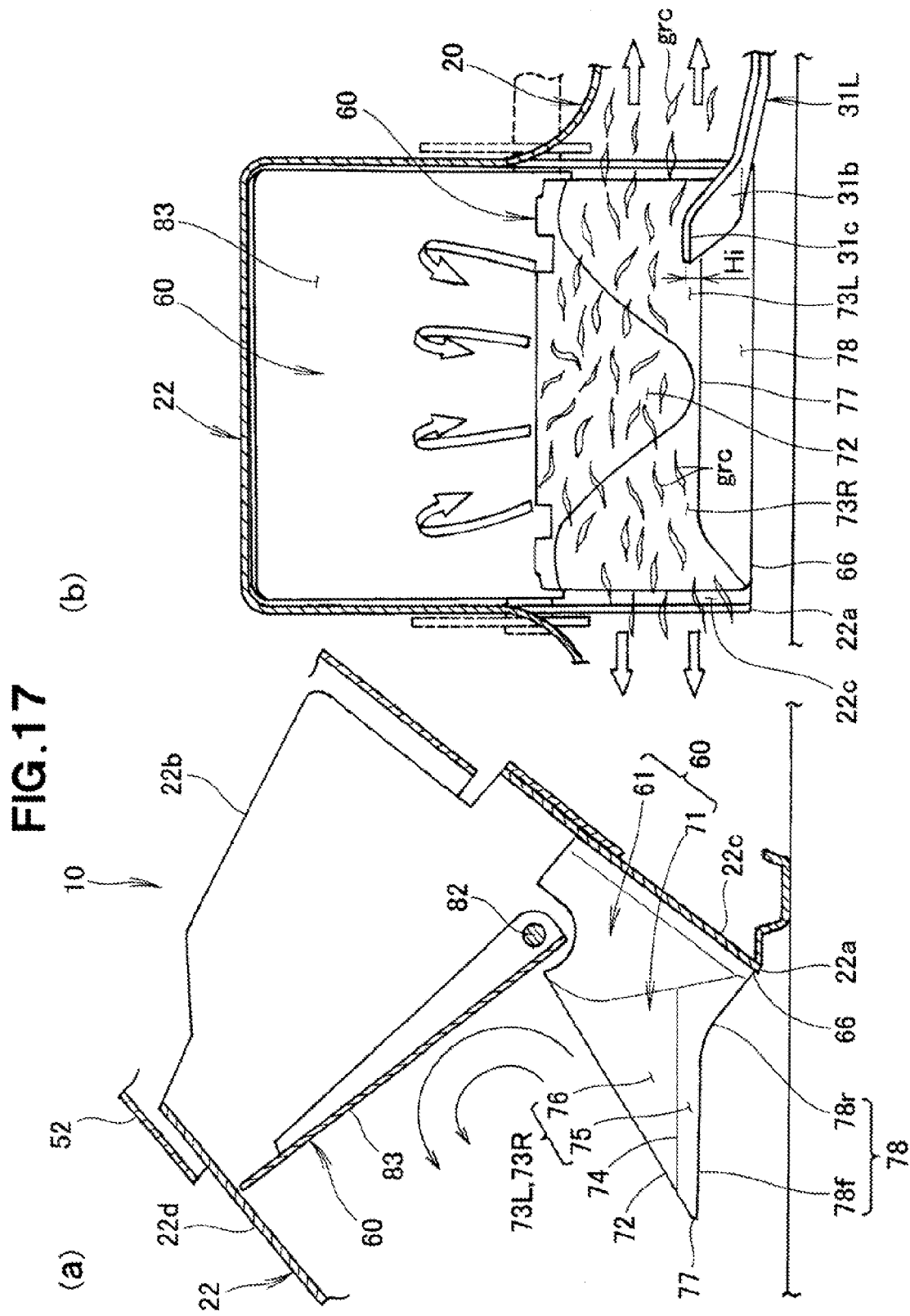
FIG. 17 illustrates behavior of the scroll guide and shutter mechanism shown FIG. 4 when the lawn mower is in a mulching mode.

FIG. 17(a) shows flows of grass clippings delivering air and grass clippings in the case where the lawn mower 10 is used in the mulching mode, and FIG. 17(b) shows flows of grass clippings delivering air and grass clippings as viewed from the entrance 22a of the grass clippings delivery passage 22.

As shown in FIGS. 6, 17(a) and 17(b), the grass clippings delivery passage 22 is kept closed while the lawn mower 10 is in the mulching mode. Grass clippings grc can be discharged downward of the housing 20 after being sufficiently chopped into finer pieces while swirling within the housing 20.

The description about the scroll guide 60 constructed in the aforementioned manner can be summarized as follows. The left and right side surfaces 73L and 73R of the scroll guide 60 respectively comprise the left and right lower slanting surfaces 75 and the left and right upper slanting surfaces 76 below and above the left and right substantial vertically-middle portions 74. By setting appropriate slant angles of the aforementioned individual slanting surfaces, it is possible to optimize flows of the grass clippings delivering air Wt (Ws) and grass clippings irrespective of whether the lawn mower 10 is in the mulching mode or in the bagging mode. Thus, grass clippings can be efficiently discharged downward of the housing 20 in mulching mode, while grass clippings can be efficiently collected in the grass clippings receptacle 51 in the bagging mode. Besides, when the lawn mower 10 has been switched from the bagging mode to the mulching mode or from the mulching mode to the bagging mode, there is no need to replace predetermined component parts of the previous or switched-from mode with component parts dedicated to the new or switched-to mode in order to optimize the flows of flows of the grass clippings delivering air Wt (Ws) and grass clippings.

In the mulching mode, the instant embodiment can prevent grass clippings, swirling within the housing 20, from undesirably falling down in the neighborhood of the entrance 22a of the grass clippings delivery passage 22 and thus can effectively retain the grass within the housing 20 (i.e., achieve an enhanced grass retaining characteristic). Therefore, the instant embodiment can discharge the grass clippings downward of the housing 20 after sufficiently chopping the grass clippings to finer pieces. Further, in the bagging mode, the instant embodiment can efficiently deliver grass clippings, swirling within the housing 20, to the grass clippings delivery passage 22.

Finally, the basic principles of the present invention are well suited for application to riding lawn mowers each of which includes left and right cutting blades and is capable of operating in both of a bagging mode and a mulching mode.

Obviously, various minor changes and modifications of the present invention are possible in light of the above teaching. It is therefore to be understood that within the scope of the appended claims the invention may be practiced otherwise than as specifically described.

What is claimed is:

1. A riding lawn mower comprising:
   a housing opening downward and having a cutting blade accommodated therein;
   a cut grass receptacle disposed rearward of the housing;
   a cut grass delivery passage for delivering grass, cut by the cutting blade, from the housing to the cut grass receptacle; and
   a shutter mechanism provided on a lower portion of the cut grass delivery passage for switching the lawn mower between a bagging mode in which grass cut by the cutting blade is delivered from the housing to the cut grass receptacle and a mulching mode in which grass cut by the cutting blade is discharged downward of the housing,
   the shutter mechanism comprising a base mounted on a lower portion of the cut grass delivery passage, a horizontal pivot shaft disposed on the lower portion of the cut grass delivery passage, and a shutter plate pivotable about the pivot shaft between a fully closed position where the shutter plate closes the cut grass delivery passage in order to execute the mulching mode and a fully opened position where the shutter plate is laid down toward a discharge side of the cut grass delivery passage in order to execute the bagging mode, and
   an operating force transmission section for transmitting opening/closing operation force, given via an operation section being disposed away from the shutter mechanism, to the shutter plate,
   wherein the operation section is configured to switch the shutter plate between the fully closed position and the fully opened position, wherein in the fully opened position of the cut grass delivery passage, the shutter plate is laid down toward a discharge side of the cut grass delivery passage, and wherein the shutter mechanism is constructed as a single unit integrally including: the base, the pivot shaft and the shutter plate assembled to the base, and the operating force transmission section, the single unit detachably attached to the cut grass delivery passage.

2. The riding lawn mower according to claim 1, wherein the pivot shaft and the shutter plate are disposed with a space from a bottom surface of the cut grass delivery passage.

3. The riding lawn mower according to claim 1, which further comprises a scroll guide provided in an entrance of the cut grass delivery passage for directing the cut grass and cut grass delivering air to the cut grass delivery passage while swirling the cut grass and the cut grass delivering air within the housing, and the scroll guide has, at a rear end thereof, a downwardly-recessed stepped section for accommodating therein the pivot shaft of the shutter mechanism.

4. The riding lawn mower according to claim 1, wherein the operating force transmission section includes a pivot arm mounted on the pivot shaft member for limited relative pivoting movement, a return spring normally urging the shutter plate toward the opened position, and an engagement section that hooks one end of the return spring.

5. The riding lawn mower according to claim 3, wherein the scroll guide is disposed along a widthwise centerline of the housing and in left-right symmetry with respect to the widthwise centerline.

6. The riding lawn mower according to claim 3, wherein the scroll guide is an integrally molded component that includes a base section located in the entrance of the grass clippings delivery passage and a guide body extending forward from the base section in a forward tapered shape.

7. The riding lawn mower according to claim 3, wherein the grass clippings delivery passage includes a bottom plate having a flat surface slanting obliquely rearwardly and upwardly from a rear end portion of the housing, and the scroll guide is detachably attached to the bottom plate of the grass clippings delivery passage.

8. The riding lawn mower according to claim 3, wherein a shape of the scroll guide as viewed in a top plan view is a substantial isosceles triangle extending into the housing while tapering forward from the base section toward the front of the lawn mower.

9. The riding lawn mower according to claim 3, wherein a shape of the scroll guide as viewed laterally in side elevation is a substantial triangle tapering forward from the base section.

10. The riding lawn mower according to claim 3, wherein when the shutter plate is in the fully opened position, the shutter plate extends generally flush with an upper surface of the scroll guide.

11. The riding lawn mower according to claim 1, wherein the shutter mechanism is a front hinge type mechanism, and the pivot shaft of the shutter plate is disposed on a front portion of the shutter plate.

* * * * *